United States Patent
Shinagawa et al.

[11] Patent Number: 5,748,715
[45] Date of Patent: May 5, 1998

[54] METHOD OF COMMUNICATIONS BETWEEN TELEPHONE AND FACSIMILE APPARATUS AND FACSIMILE APPARATUS CAPABLE OF COMMUNICATIONS WITH TELEPHONE

[75] Inventors: Tetsuo Shinagawa, Odawara; Yumiko Watanabe, Tokyo; Akio Shinagawa, Hitachinaka; Fumitaka Ito, Chiba-ken, all of Japan

[73] Assignee: Hitachi, Ltd., Tokyo, Japan

[21] Appl. No.: 531,651

[22] Filed: Sep. 21, 1995

[30] Foreign Application Priority Data

Sep. 22, 1994 [JP] Japan ................. 6-228093
Sep. 29, 1994 [JP] Japan ................. 6-235307

[51] Int. Cl.⁶ ........................................ H04M 11/00
[52] U.S. Cl. .............. 379/100.13; 358/438; 358/462; 379/93.18
[58] Field of Search ................ 379/100, 96–99, 379/93, 67, 70, 88, 89, 93.01, 100.01, 100.05, 100.09, 100.13–100.15, 93.18, 93.17; 358/400, 434–440, 442, 462, 468, 470

[56] References Cited

U.S. PATENT DOCUMENTS

| | | | |
|---|---|---|---|
| 4,829,559 | 5/1989 | Izawa et al. | 379/100 |
| 4,864,600 | 9/1989 | Fernandez | 379/96 |
| 4,926,463 | 5/1990 | Ukegawa | 379/88 |
| 5,022,072 | 6/1991 | Sakakibara et al. | 379/100 |
| 5,311,573 | 5/1994 | Otsuki | 379/100 |

FOREIGN PATENT DOCUMENTS

| | | | |
|---|---|---|---|
| 1-293025 | 11/1989 | Japan | 379/100 |
| 5-30343 | 5/1993 | Japan | |

*Primary Examiner*—Wing F. Chan
*Attorney, Agent, or Firm*—Antonelli, Terry, Stout, & Kraus, LLP

[57] ABSTRACT

A facsimile apparatus which utilizes a dialing signal of a tone signal and can be used as a called-side communication apparatus to print desired character string information through a simple operation of a calling-side telephone set, and also a facsimile communication method in the facsimile apparatus. In the called-side facsimile apparatus, a character string information memory stores therein a plurality of character string information and unique numbers associated therewith; whereas a character information memory stores therein image information corresponding to the respective character string information. When a user of the calling-side communication apparatus enters a number corresponding to desired character string information, this causes a dialing signal indicative of the number to be transmitted to the facsimile apparatus. In the facsimile apparatus, a control unit converts to image information the character string information corresponding to the number indicated by the dialing signal detected by a dialing signal detector, and the converted image information is printed by a printer.

2 Claims, 22 Drawing Sheets

| MESSAGE NUMBER | CHARACTER STRING INFORMATION |
|---|---|
| 01 | イマカラ カエルヨ (^O^) |
| 02 | カエルノ オソクナル (^_^;) |
| 03 | エキ マデ ムカエニ キテ |
| 04 | ゴハン イリマセン (^^;) |
| 05 | キョウハ カエレマセン (;_;) |

031900*#
— END CODE 213
— 4-DIGIT NUMBER (0000~9999) 212
MESSAGE NUMBER 211

|   | \\ 209 | UPPER 4 BITS (208) | | | | | | | | | | | | | | |
|---|---|---|---|---|---|---|---|---|---|---|---|---|---|---|---|---|
|   |   | 0x | 1x | 2x | 3x | 4x | 5x | 6x | 7x | 8x | 9x | Ax | Bx | Cx | Dx | Ex | Fx |
| LOWER 4 BITS | x0 | | | ␣ | 0 | @ | P | ` | p | | | | ー | タ | ミ | | |
| | x1 | | | ! | 1 | A | Q | a | q | | | | ア | チ | ム | | |
| | x2 | | | " | 2 | B | R | b | r | | | | イ | ツ | メ | | |
| | x3 | | | # | 3 | C | S | c | s | | | | ウ | テ | モ | | |
| | x4 | | | $ | 4 | D | T | d | t | | | | エ | ト | ヤ | | |
| | x5 | | | % | 5 | E | U | e | u | | | | オ | ナ | ユ | | |
| | x6 | | | & | 6 | F | V | f | v | | | ヲ | カ | ニ | ヨ | | |
| | x7 | | | ' | 7 | G | W | g | w | | | ァ | キ | ヌ | ラ | | |
| | x8 | | | ( | 8 | H | X | h | x | | | ィ | ク | ネ | リ | | |
| | x9 | | | ) | 9 | I | Y | i | y | | | ゥ | ケ | ノ | ル | | |
| | xA | | | * | : | J | Z | j | z | | | ェ | コ | ハ | レ | | |
| | xB | | | + | ; | K | [ | k | | | | ォ | サ | ヒ | ロ | | |
| | xC | | | , | < | L | \ | l | | | | ャ | シ | フ | ワ | | |
| | xD | | | - | = | M | ] | m | | | | ュ | ス | ヘ | ン | | |
| | xE | | | . | > | N | ^ | n | | | | ョ | セ | ホ | ゛ | | |
| | xF | | | / | ? | O | _ | o | | | | ッ | ソ | マ | ゜ | | |

210

␣ : BLANK

FIG. 9

| CHARACTER STRING INFORMATION | イ | ア | カ | ラ | ] | カ | エ | ル | ヨ | ( | ` | o | ` | ) |
|---|---|---|---|---|---|---|---|---|---|---|---|---|---|---|
| CHARACTER CODE | B2 | CF | B6 | D7 | 20 | B6 | B4 | D9 | D6 | 28 | 5F | 4F | 5F | 29 |

202 CHARACTER STRING INFORMATION
203 CHARACTER CODE

FIG. 10

| CHARACTER CODE | CHARACTER PATTERN | CHARACTER |
|---|---|---|
| B2 | (7×7 dot pattern) | FIRST LINE — 01<br>SECOND LINE — 02<br>THIRD LINE — 04<br>FOURTH LINE — 0C<br>FIFTH LINE — 14<br>SIXTH LINE — 04<br>SEVENTH LINE — 04 |

204 CHARACTER CODE
205 CHARACTER PATTERN
206 CHARACTER

FIG. 14
| MESSAGE NUMBER | CHARACTER STRING INFORMATION |
|---|---|
| 01 | キョウハ |
| 02 | アシタハ |
| 03 | コンバンハ |
| 11 | カイシャ マデ |
| 12 | エキ マデ |
| 21 | ムカエニ キテ |
| 22 | カエリガ オソク ナリマス |
| 23 | ゴハンハ イリマセン |
FIG. 15
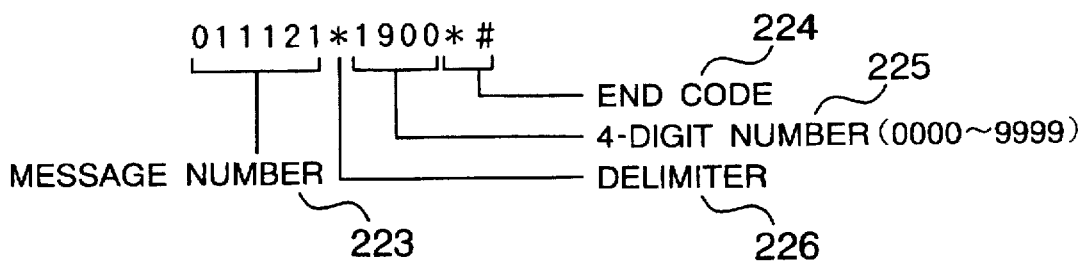
FIG. 16
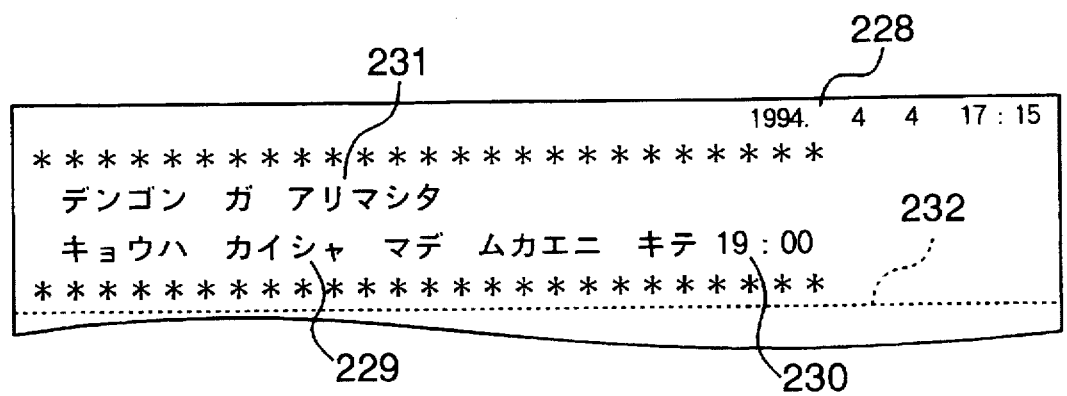

FIG. 18
| MESSAGE NUMBER | IMAGE INFORMATION |
|---|---|
| 01 |  |
| 02 |  |
FIG. 19
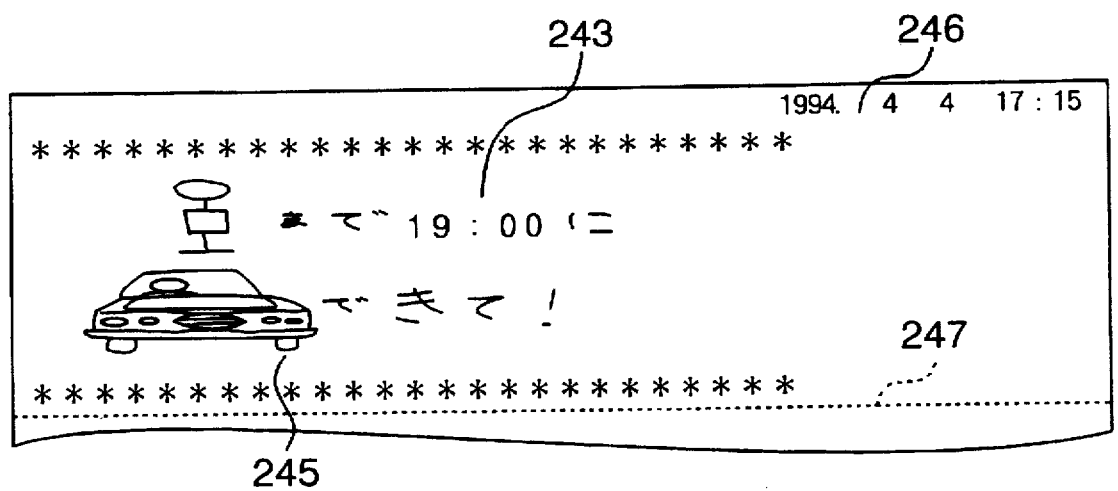

FIG. 27

| | MESSAGE NUMBER | CONTENTS | |
|---|---|---|---|
| FEELING-ASSOCIATED MESSAGES | 01 | ゴメンナサイ (;;) | ×××× ×××× |
| | 02 | アリガトウ \(^o^)/ | ×××× ×××× |
| | 03 | オメデトウ (^o^)V | ×××× ×××× |
| | 04 | アイタイ (^_^) | ×××× ×××× |
| | 05 | ガンバッテネ (^o^)V | ×××× ×××× |
| | 06 | ゲンキダシテネ | ×××× ×××× |
| | 07 | ハンセイシテマス (;_;) | ×××× ×××× |
| APPOINTED-MEETING-ASSOCIATED MESSAGES | 08 | ヨテイ チュウシデス | ×××× ×××× |
| | 09 | ヨテイドオリデス | ×××× ×××× |
| | 10 | イツモノ バショデ | ×××× ×××× |
| | 11 | イツモノ ジカンニ | ×××× ×××× |
| | 12 | オクレマス | ×××× ×××× |
| | 13 | デンワ クダサイ | ×××× ×××× |
| | 14 | イマカラ カエリマス (^o^) | ××××× ×××× |
| HOMECOMING-ASSOCIATED MESSAGES | 15 | カエルノ オソクナル (^_^;) | ××××× ×××× |
| | 16 | キョウハ カエレマセン (;_;) | ××××× ×××× |
| | 17 | ムカエニ キテ (^_^) | ××××× ×××× |
| | 18 | ガイショク シマス | ×××× ×××× |
| | 19 | ゴハン タベマス | ×××× ×××× |
| | 20 | サキニ ショクジ スマセテ | ×××× ×××× |

METHOD OF COMMUNICATIONS BETWEEN TELEPHONE AND FACSIMILE APPARATUS AND FACSIMILE APPARATUS CAPABLE OF COMMUNICATIONS WITH TELEPHONE

BACKGROUND OF THE INVENTION

The present invention relates to a facsimile apparatus and a communication method using the facsimile apparatus. More particularly, the present invention relates to a technique for allowing printing of a desired string of characters or images in a facsimile apparatus used as a communication apparatus on a called side through simple operations of a communication apparatus such as a telephone on a calling side and utilizing a dialing signal based on a tone signal.

A conventional facsimile apparatus for performing data communication with the data included in an analog signal band range, mainly carries out communication control based on T30 recommended by the CCITT (Comite Consultatif International Telegraphique et Telephonique), and also is equipped often with additional functions including a function of changeover between a telephone and a facsimile apparatus for effective use of a single telephone line and an automatic answering function.

These additional functions are however limited to such simple functions that can be executed by a dialing signal (DTMF (dual tone multiple frequency signal) signal) corresponding to a secret number or personal identification number individually registered and sent from a remote site (such as a public telephone booth) by a specific caller.

Such being the case, when the calling side is a telephone and the called side is a facsimile apparatus, caller's voice message alone is left in the facsimile apparatus as a record based on its automatic answering function, and thus in actual circumstances, not only such inherent function of the facsimile apparatus per se as to "leave the party's message in the form of a recorded paper" cannot be made the most of, but also an audibly or orally handicapped person or a deaf-and-dumb person cannot transmit his or her message contents fully.

As mentioned above, such a prior art facsimile apparatus having the additional functions has been insufficient in its facsimile function with respect to a call received from an originally voice-intended telephone.

Meanwhile, conventional communication apparatuses such as telephones or facsimile apparatuses can carry out information communication by utilizing a dialing signal based on a tone signal, i.e., a dial signal based on a push button signal.

Disclosed, e.g., in JP-A-61-274461 is a technique for allowing communication of information expressed in terms of alphabets and numerals with use of push button keys designated by "#", "*" and "0" to "9" provided on a communication apparatus.

In the communication apparatus, more specifically, 2 or 3 alphabet characters for example are allocated to each of ten push button keys "0" to "9", as the push button key "1" allocated to alphabet characters "A", "B" and "C", the push button key "2" allocated to alphabet characters "D", "E" and "F", and so on. In this method, one depression of the push button key "1" corresponds to the input of "1", two-time depressions of the key "1" correspond to the input of "A", three-time depressions of the key "1" corresponds to the input of "B", and four-time depressions of the key "1" corresponds to the input of "C". The key "#" is used for determining the input.

For example, depressing of the push button keys "1" and "#" in this order causes data indicative of "1" to be transmitted to the communication apparatus as a dial signal; depressing of the keys "1", "1" and "#" in this order causes data indicative of "A" to be transmitted to the communication apparatus; depressing of the keys "1", "1", "1" and "#" causes data indicative of "B" to be transmitted to the communication apparatus; and depressing of the keys "1", "1", "1", "1" and "#" causes data indicative of "C" to be transmitted to the communication apparatus. In this way, when determining the input with the depression of the key "#", the operator can continually input characters in such a manner that data indicative of these characters can be sent out in the form of dial signals.

The communication apparatus on the called side, on the other hand, detects dial signals received from the telephone line and converts the detected dial signals to corresponding characters. When the detected dial signals correspond to "1", "1", "#", "1", "1", "1", "#", "1", and "#" for example, they are converted to characters "A", "B" and "1". The above prior art is designed so that the prior art detects dial signals and repeats the conversion of them to corresponding characters until the communication apparatus on the calling side cuts off the telephone line, previously stores the converted characters temporarily in a memory, and as soon as the calling-side communication apparatus cuts off the telephone line, collectively outputs the temporarily stored characters.

As has been explained above, the above prior art can realize communication of a string of characters including alphabets and numerals based on dial signals received from the calling-side communication apparatus.

When such a communication apparatus is considered to be actually used, it is desirable that the apparatus can realize communication of a string of characters. In the prior art, however, since 2 or 3 characters are allocated to each of the 10 push button keys "0" to "9", there occurs a problem with poor handleability, in particular, in such a language as to use many characters. In the case of Japanese for example, even when Japanese is limited to either one of Hira-gana characters and Kata-kana characters, some 6 characters including numeral(s) are required to be allocated to each of the push button keys upon simple allocation of 50 Hira-gana or Kata-kana characters. For this reason, input of a Hira-gana or Kata-kana character disadvantageously requires the operator to continually depress an identical push button key six times at most, which results in less ease of its use.

Further, as the number of times the operator depresses an identical push button key increases, erroneous operation, i.e., wrong depressing count tends to frequently take place. Further, when alphabet characters are also used at the same time, the number of characters allocated to one push button key is further increased with the result in its deteriorated handleability.

Explanation will be made as to other problems of the prior art facsimile apparatus. A facsimile apparatus, which has nowadays been widely used, is a transmission apparatus which can transfer document data or image data such as drawings between this facsimile apparatus and a remote site communication apparatus through a public line of telecommunication. The facsimile apparatus is in many cases connected to a telephone line dedicated to the facsimile apparatus, in particular, when the facsimile apparatus is used for business purpose. When such a facsimile apparatus connected to the facsimile-apparatus-dedicated line receives a telephone call, the facsimile apparatus automatically connects itself to the telephone line and issues a response for facsimile reception. For this reason, even when the facsimile apparatus receives a telephone voice call (indicative of the telephone number of this facsimile apparatus) from a general telephone set, the facsimile apparatus also answers it (which the caller can hear like "Pee-hyor-r-rr") for the same facsimile reception as the above case and thus the caller cannot transmit his/her message.

In this way, when the caller makes a call over such an automatically answering facsimile apparatus from a telephone set, the caller cannot transmit his/her message at all. A means for solving such a problem is disclosed, e.g., in JP-A-62-260472. In this patent application publication, a facsimile apparatus is provided with a DTMF signal detector which, after issuing a response to receive facsimile message in such a manner as mentioned above, detects a DTMF signal (dialing signal) received through a telephone line to print a number indicative of the DTMF signal. The caller, who is calling from not a facsimile apparatus but a telephone set, can transmit his/her message based on numbers to the facsimile apparatus when the facsimile apparatus answers the call by sending the DTMF signal. When the facsimile apparatus receives a call, the facsimile apparatus automatically answers the incoming call to be automatically connected to the telephone line and issues a response for facsimile reception as in the aforementioned facsimile apparatus and at the same time, checks the reception or non-reception of the DTMF signal from the caller. If the caller is a facsimile apparatus, then the calling facsimile apparatus returns, in response to the response for facsimile reception, a send acknowledge response to the called facsimile apparatus to perform the aforementioned facsimile reception. This causes the facsimile communication to start in the case where the caller is the facsimile apparatus. In the meanwhile, when the caller is a telephone set, the called facsimile apparatus cannot return a response to perform the facsimile reception. In this case, the caller sends a predetermined command in the form of a DTMF signal to the called facsimile apparatus. The called facsimile apparatus, when receiving and detecting the command from the caller, interprets it as the caller being demanding to send his/her message from the telephone and once stores therein numbers indicative of DTMF signals subsequent to the first command DTMF signal for later printout thereof on recording paper. This enables the telephone to transmit numeral information to the facsimile apparatus and the facsimile apparatus to print out the information.

Thus, even in the case where the caller calls from the telephone set, the prior art facsimile apparatus of the type which, when receiving a call, can automatically connect itself to the telephone line for facsimile reception and issue a response for facsimile reception, the caller can send information indicative numbers such as a telephone number to the facsimile apparatus for printout thereof.

These years, facsimile apparatuses have been widely used even in ordinary homes. With use of the increased number of facsimile apparatuses, there has been increased such cases that a single telephone line is shared between the facsimile apparatus and telephone, unlike business purpose. In such a case, in general, changeover between the telephone and facsimile apparatus is carried out based on its automatic changeover function as mentioned above. More in detail, when the facsimile apparatus receives a call from the telephone line, the facsimile apparatus sounds a ringing tone of the telephone a predetermined number of times. When no one takes the call within the predetermined number of ringings, the facsimile apparatus issues a response to perform the facsimile reception as in the conventional facsimile apparatus. With it, the single telephone line can be shared between the facsimile apparatus and telephone. Further, when the facsimile apparatus is used in ordinary homes, an automatic answering telephone set is sometimes connected to the facsimile apparatus. In this case, when the automatic answering telephone set is set in its automatic answering mode, it is general that the automatic answering telephone is automatically connected faster than the facsimile apparatus to the telephone line.

As seen from the aforementioned prior art, the major purpose of providing the DTMF signal detector to the facsimile apparatus to allow even not the facsimile apparatus but the telephone to transmit information to the called facsimile apparatus based on DTMF signals was, when a caller makes a call from not the facsimile apparatus but the telephone set over the facsimile apparatus of the type connected to the facsimile-exclusive telephone line for facsimile communication alone, that the caller can send information such as caller's telephone number to the facsimile apparatus by sending DTMF signals indicative of numbers. However, as many facsimile apparatuses are installed in ordinary homes, the following use purpose has been demanded. That is, in some cases, a caller wants to send information from such a place that there is no facsimile apparatus but wants not to send it by usual telephone speech. For example, there is a case where a caller dislikes those close to him/her to pick up his/her conversation as when the caller make a call from a public telephone installed in a crowded street, but there is no facsimile apparatus around there.

When the caller wants to send information based on DTMF signals to the facsimile apparatus with such a purpose, there may occur such an extreme case that, even when a call made by the caller was answered by a person who picked up a telephone handset connected to the called facsimile apparatus, the caller wants to send the DTMF signal information for its printout. There may occur another case where, even a call made by the caller is automatically answered by the automatic answering machine connected to the facsimile apparatus, the caller wants the facsimile apparatus to print his/her message not in the form of recorded vocal message. In the aforementioned prior art facsimile apparatus, however, the transmission of the DTMF signal-based information from the telephone set can be realized only when the facsimile apparatus receiving a call automatically connects itself to the telephone line, issues a response for facsimile reception, and receives a return response as a DTMF signal from the caller. In other words, the prior art fails to take into consideration the information transmission of the DTMF signal from the caller telephone set to the facsimile apparatus when a called person picks up a handset of the telephone set connected to the facsimile apparatus to answer the call or when an automatic answering telephone set connected to the facsimile apparatus automatically connects to the telephone line for its automatic answering operation prior to the facsimile apparatus.

SUMMARY OF THE INVENTION

It is therefore an object of the present invention to provide a method for establishing communication between a facsimile apparatus whose usage has been limited only to inter-communications and a telephone set.

Another object of the present invention is to provide a facsimile apparatus which can communicate with a telephone set most widely used nowadays based on a signal received from the telephone set.

In accordance with an aspect of the present invention, the above object is attained by a facsimile apparatus in which a communication controller comprises means for detecting not only "1", "2", "3", "4", "5", "6", "7", "8", "9", "*", "0", "#" but also "A", "B", "C" and "D" as dialing signals issued from a calling telephone set connected to the facsimile apparatus, i.e., DTMF signals generated when the caller of the telephone set depresses push button keys thereon, means for collating the received dialing signals with formatted messages stored in the telephone set, and means for displaying and recording the collated formatted messages or the dialing signals themselves.

With the arrangement of the present invention, the conventional communication form which was possible only for inter-facsimile communications can be expanded so that even a dialing signal of a telephone set enables communication between the telephone set and the facsimile apparatus.

A further object of the present invention is to provide a technique for enabling printout of a desired string(s) of characters in a facsimile apparatus used as a called station communication apparatus through caller's simple operation of a calling station communication apparatus, using tone signals based on dialing signals.

In accordance with another aspect of the present invention, the above object is attained by providing a facsimile apparatus which is used as a called station communication apparatus and which previously stores therein a plurality of character string information and unique numbers associated therewith. When a user of a calling station communication apparatus enters a number corresponding to desired character string information, the calling station communication apparatus transmits a dialing signal indicative of the entered number to the called station communication apparatus. The called station communication apparatus converts the character string information corresponding to the number indicated by the dialing signal transmitted from the calling station communication apparatus and prints the converted image information.

More specifically, in accordance with the present invention, there is provided a facsimile apparatus used as a called station communication apparatus which comprises a dialing-signal detector for detecting a dialing signal transmitted from a telephone line, a recording unit for printing image information, a character string information memory for previously storing therein a plurality of character string information and unique numbers each associated with corresponding character string information, a character information memory for previously storing therein image information corresponding to respective characters constituting the character string information, and a controller, when the dialing signal detected by the dialing-signal detector indicates one of the unique numbers, for acquiring one of the character string information stored by the character string information memory corresponding to the one unique number, for performing control to cause acquisition of the image information corresponding to all the characters of the acquired character string information by referring to contents stored in the character information memory, and to cause the recording unit to print the acquired image information.

In such a communication apparatus capable of communications using a dialing signal of a tone signal, there are generally a plurality of, frequently at most several tens of types of character strings indicative of contents to be transmitted. Accordingly, all character string information considered necessary are previously stored in a facsimile apparatus for use as a called station communication apparatus so that the respective character string information are specified by unique numbers.

When the number of types of character string information is 10 or less, all the character string information can be specified by one-digit numbers. When the number of such types is 100 or less, all the character string information can be specified by 2-digit numbers. In the latter case, the character string information are previously stored in the facsimile apparatus of the called station, so that, even when the number of sorts of characters to be used is increased (for example, even when Kanji characters or chinese characters are used in addition to Hira-kana and Kata-kana characters in Japanese), information to be entered in the calling station communication apparatus are only numbers corresponding to character string information and dialing signals transmitted from the calling-side communication apparatus are only numbers corresponding to the character string information, which results in that the amount of communication information is prevented from increasing, the operation of the calling-side communication apparatus can be made highly simple, and erroneous operation can less occur.

Yet a further object of the present embodiment is to provide a facsimile apparatus having a function of receiving information in the form of a DTMF signal, which apparatus can receive the information in the form of the DTMF signal even when a telephone set connected to the facsimile apparatus is put in its off-hook state to connect to a telephone line before the facsimile apparatus is automatically connected to the line and answers an incoming call to perform its facsimile receiving operation.

In accordance with a further aspect of the present invention, the above object is attained by providing a facsimile apparatus which has a function of receiving information in the form of a DTMF signal transmitted from a telephone set and detected thereby, and wherein there is provided in the facsimile apparatus a telephone-set hook detector for detecting a change in a hook state of the telephone set connected to the facsimile apparatus, so that the facsimile apparatus monitors a change in the hook state of the telephone set connected thereto when a call is received from a telephone line, the facsimile apparatus detects the presence or absence of reception of a DTMF signal for instruction of transmission of information from the calling side even when the incoming call causes the telephone set to be put in the off-hook state as when the incoming call from the telephone line causes the facsimile apparatus to be automatically connected to the line, and the facsimile apparatus receives the information of the DTMF signal from the telephone set when the reception of the DTMF signal indicative of transmission of the information based on the DTMF signal is detected.

In the present invention, the telephone-set hook detector for detecting a change in the hook state of the telephone set connected to the facsimile apparatus detects a change in the hook state of the telephone set from its on-hook state to the off-hook state or the off-hook state to the on-hook state. When the facsimile apparatus receives a ringing signal from the telephone line, the facsimile apparatus continuously sends the ringing signal to the telephone set connected thereto by a predetermined number of time, thus sounding the bell of the telephone set. At this time, in the facsimile apparatus, the aforementioned telephone-set hook detector checks whether or not the connected telephone set is put in the off-hook state, i.e., the user of the called side answered the phone. When detecting the off-hook state of the telephone set, the facsimile apparatus detects the DTMF signal from this time point. When detecting the DTMF signal and finding that the calling party is instructing the called facsimile apparatus to receive the information of the DTMF signal, i.e., when detecting a predetermined command in the form of the DTMF signal, the facsimile apparatus receives as information the DTMF signal following the command DTMF signal. As a result, even when the user of the facsimile apparatus answered the telephone by picking up the handset of the telephone set connected to the facsimile apparatus, the facsimile apparatus can receive the information of the DTMF signal. Further, even when the telephone set connected to the facsimile apparatus is of an automatic answering type and the automatic answering telephone set automatically connects to the telephone line faster than the facsimile apparatus connects to the telephone line, the facsimile apparatus can detect the connection of the automatic answering telephone set to the line, i.e., the off-hook state thereof for detection of the DTMF signal, whereby the facsimile apparatus can receive the DTMF signal information.

In the meanwhile, when the ringing of the bell of the telephone set connected to the facsimile apparatus by a predetermined number of times resulted in failure of change to the off-hook state of the telephone set, the facsimile apparatus automatically connects to the line as in the prior art facsimile apparatus. Even in this case, the facsimile apparatus detects the DTMF signal after connected to the line. Thus when the calling party transmits information in the form of a DTMF signal, the called-side facsimile apparatus can receive the DTMF signal information.

BRIEF DESCRIPTION OF THE DRAWINGS

FIG. 8 is an exemplary character table;

FIG. 9 is a diagram showing an example of character codes corresponding to character string information;

FIG. 10 is a diagram for explaining how to represent characters;

FIG. 14 is a table showing another example of character string information;

FIG. 15 is a diagram for explaining another user operating procedure of the sender-side communication apparatus;

FIG. 16 is a diagram showing another example of printout of message information;

FIG. 18 shows an example of image information;

FIG. 19 shows a further example of printout of message information;

FIG. 27 is a table showing a correspondence relationship between message numbers and statements of formatted messages in the embodiment of FIG. 22;

DESCRIPTION OF THE PREFERRED EMBODIMENTS

Figure 1:
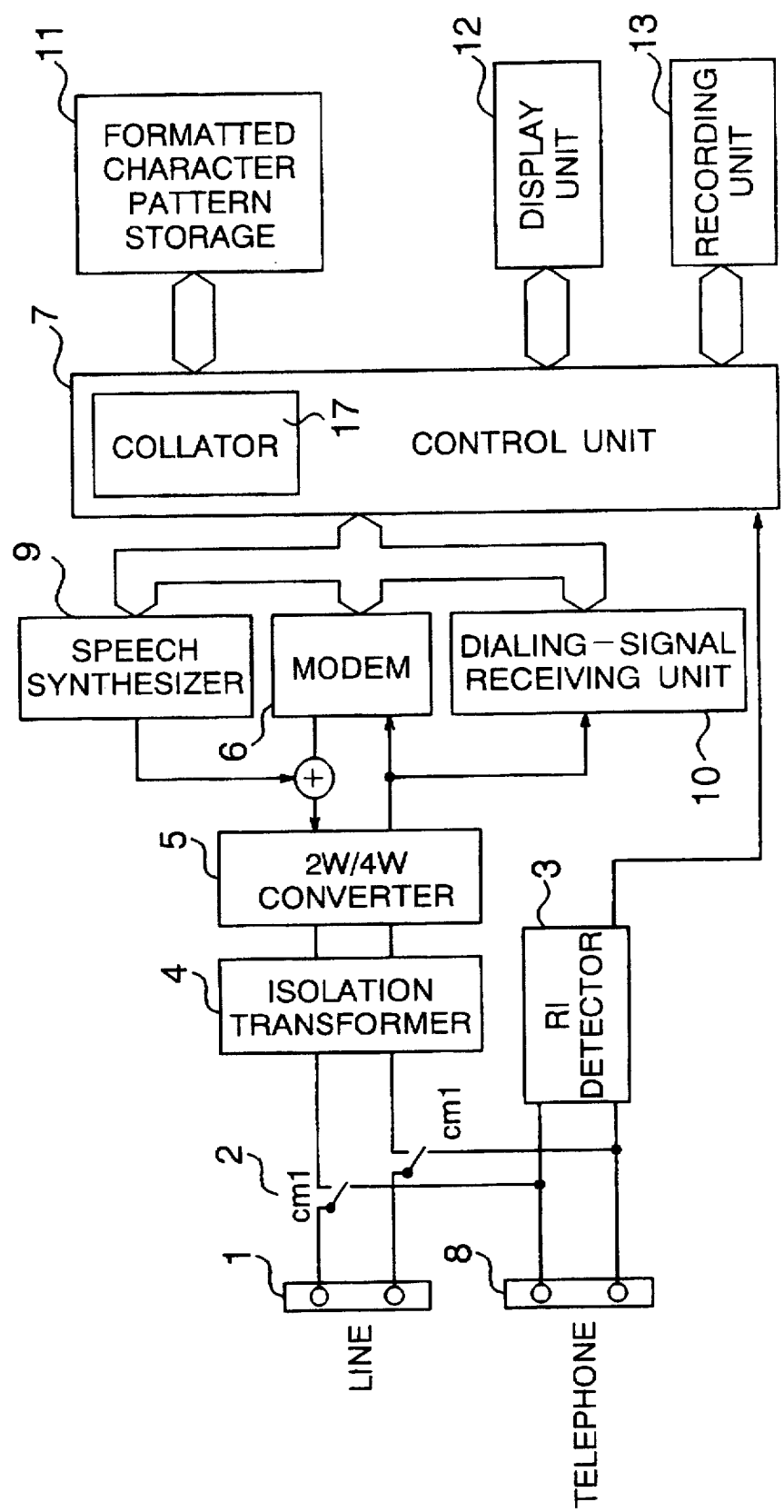
FIG. 1 is a block diagram of an arrangement of a facsimile apparatus in accordance with an embodiment of the present invention.

Preferred embodiments of the present invention will be detailed with reference to the attached drawings, in which parts having substantially the same functions are denoted by the same reference numerals or symbols and explanation thereof is omitted to avoid the double explanation.

Referring first to FIG. 1, there is shown a block diagram of an arrangement of a facsimile apparatus in accordance with an embodiment of the present invention.

In FIG. 1, a telephone line may be selectively connected to either one of the facsimile apparatus or a telephone set through a modular jack type line connecting terminals 1 to be connected to the telephone line and through a cm1 relay contact switch 2. The illustrated facsimile apparatus includes an Ri detector 3 for detecting an incoming ringing or bell signal from the telephone line, an insulating or isolation transformer 4 for forming a telephone line loop for transfer of various types of signals, a 2-wire/4-wire converter 5 for changeover between 2 wires and 4 wires, a modem 6 for sending and detecting various types of signals to control communication based on T30 recommended by the CCITT, a control unit 7 for performing general control, a speech synthesizer LIS 9 for sending a voice message for guidance, a dialing signal receiver 10 for receiving a dialing signal from a calling telephone set, a formatted character pattern storage 11 for storing therein formatted messages, a display unit 12 for displaying thereon the state of the facsimile apparatus, various sorts of functions and the received signal, and a recorder 13 for recording various sorts of register information received from the calling telephone set. A telephone set, is selectively switchedly connected as an attachment to the facsimile apparatus through the modular jack type telephone-set connecting terminals 8. The control unit 7 includes a collator 17 for collating the received dialing signal with the formatted messages of the formatted character pattern storage 11.

Figure 2:
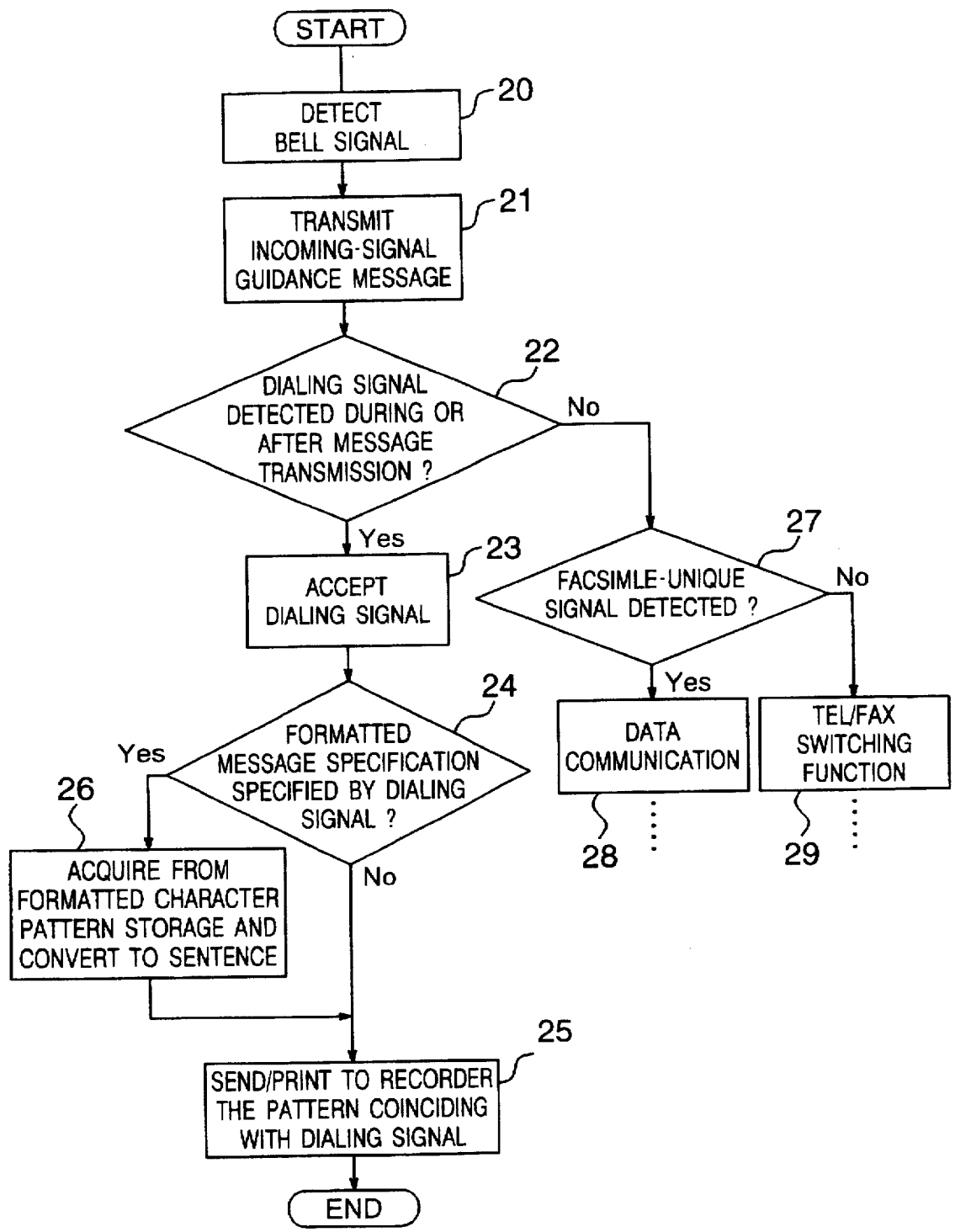
FIG. 2 is a flowchart for explaining the operation of the facsimile apparatus of FIG. 1.

Shown in FIG. 2 is a flowchart for explaining an example of operation of the facsimile apparatus of FIG. 1 when communication between the telephone set and facsimile apparatus is actually carried out in accordance with the present invention.

More in detail, when it is desired for the facsimile apparatus to receive a dialing signal from a calling telephone set, an exchange facility sends a bell signal to the facsimile apparatus, when receiving the dialing signal issued from the calling telephone set. The bell signal is received at the Ri detector 3 and then sent to the control unit 7 for entire control (step 20). When the cm1 relay contact switch 2 is then switched from the telephone set to the facsimile apparatus to connect the telephone line to the facsimile apparatus for formation of a loop with the calling terminal, there is established a loop between the facsimile apparatus and exchange facility through the insulating transformer 4. At this time, the facsimile apparatus issues from the speech synthesizer LSI 9 to the calling telephone set a guidance message prompting the caller to issue a dialing signal (step 21). When the facsimile apparatus receives at the dialing signal receiver 10 a specific dialing signal that appears to be received from the connected calling telephone set during the issuance of the message or after the issuance thereof (step 22), the dialing signal receiver 10 sends the received dialing signal to the controller 7 (step 23). When the received signal does not contain information indicative of specification of a specific formatted message held in the interior of the facsimile apparatus (step 24), the signal is then sent as it is from the controller 7 to the display unit 12 and recorder 13 for printout (step 25). In this case, the recordable printout information is basically a simple string of numbers such as a telephone number. However, in the case of presence of the specification of a formatted message held in the facsimile apparatus (step 26), the controller 7 sequentially transfers the specified character information from the formatted character pattern storage 11 to the display unit 12 and recorder 13 for display or printout, thus realizing display or printout of more information.

When the facsimile apparatus receives at the modem 6 a signal unique to the facsimile apparatus during the issuance of the guidance message from the speech synthesizer LSI 9 (step 27), this means that the calling party is a facsimile apparatus and thus the same data communication as in the prior art is carried out (step 28).

When the facsimile apparatus fails in the step 27 to receive a signal unique to the facsimile apparatus, the facsimile apparatus judges that the calling party is a telephone set and thus known telephone/fax switching operation is carried out as generally done in conventional telephone-built-in facsimile apparatuses (step 29).

Under the aforementioned control, communication between the telephone set and facsimile apparatus can be realized when the facsimile apparatus has a function of receiving a dialing signal from the calling telephone set.

As has been explained above, in accordance with the present embodiment, there can be obtained a method for realizing easy communication between a voice-intended telephone set and a data-intended facsimile apparatus as well as a facsimile apparatus for implementing the method.

Figure 3:
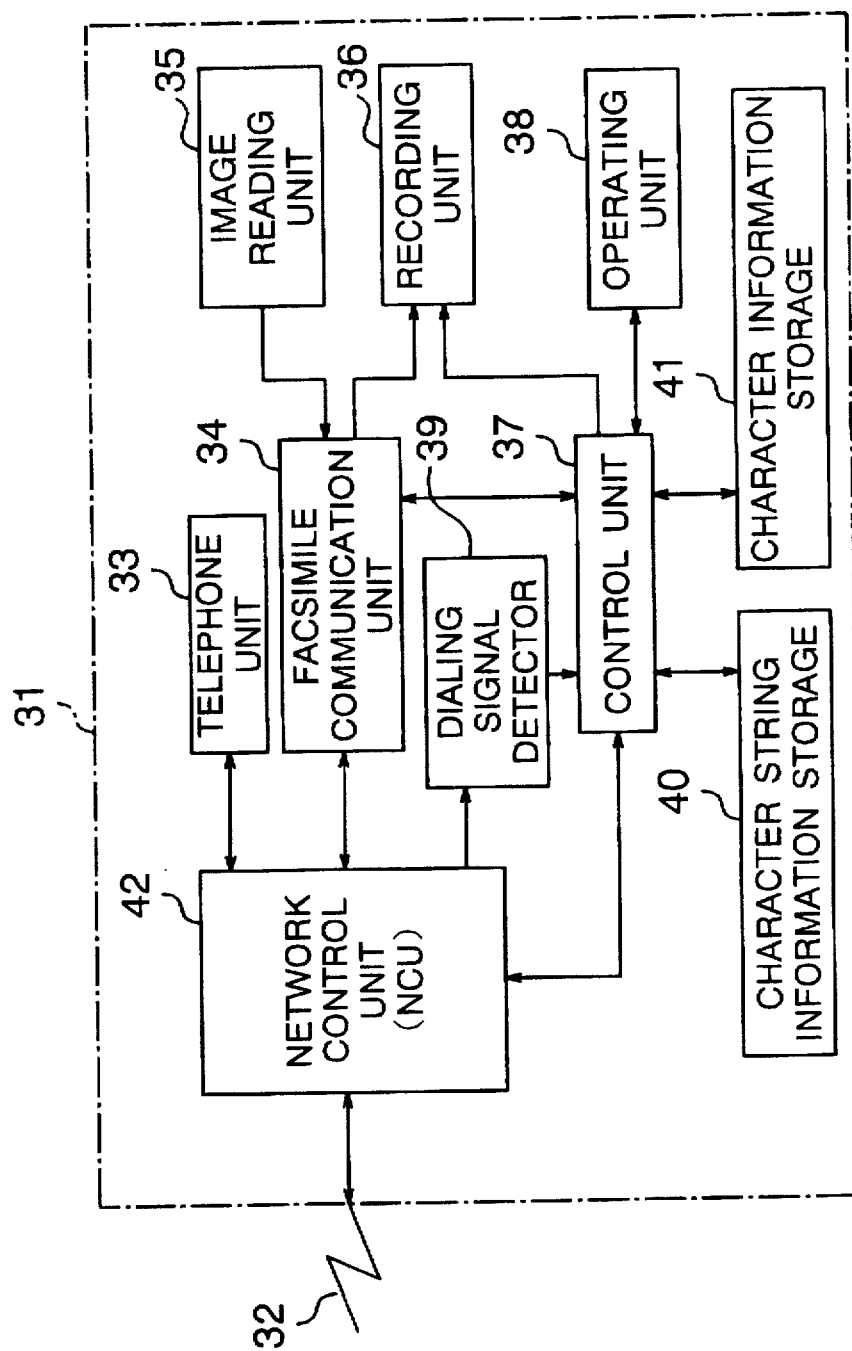
FIG. 3 is a block diagram of an arrangement of a facsimile apparatus in accordance with another embodiment of the present invention.

FIG. 3 shows a block diagram of an arrangement of a facsimile apparatus 31 in accordance with another embodiment of the present invention. The facsimile apparatus 31 of FIG. 3 includes a telephone line 32, a telephone unit 33, and a facsimile communication unit 34 for performing facsimile communication.

The facsimile apparatus 31 also includes an image reading unit 35 for reading out image information from an original document and a recorder 36 for printing on recording paper image information transmitted from the telephone line 32 or for printing message information (to be explained later) on recording paper.

Further included in the facsimile apparatus 31 are a control unit 37 for performing control over the entire operation of the facsimile apparatus 31, a network control unit (NCU) 42 for controlling the interconnection between the facsimile apparatus 31 and telephone line 32, an operating unit 38 by which a user instructs various operations necessary for facsimile communication or to display the state of the facsimile apparatus 31, a dialing signal detector 39 for detecting a dialing signal based on a tone signal (DTMF signal) sent from the telephone line 32, a character string information storage 40, and a character information storage 41, which will be detailed later.

Figure 4:
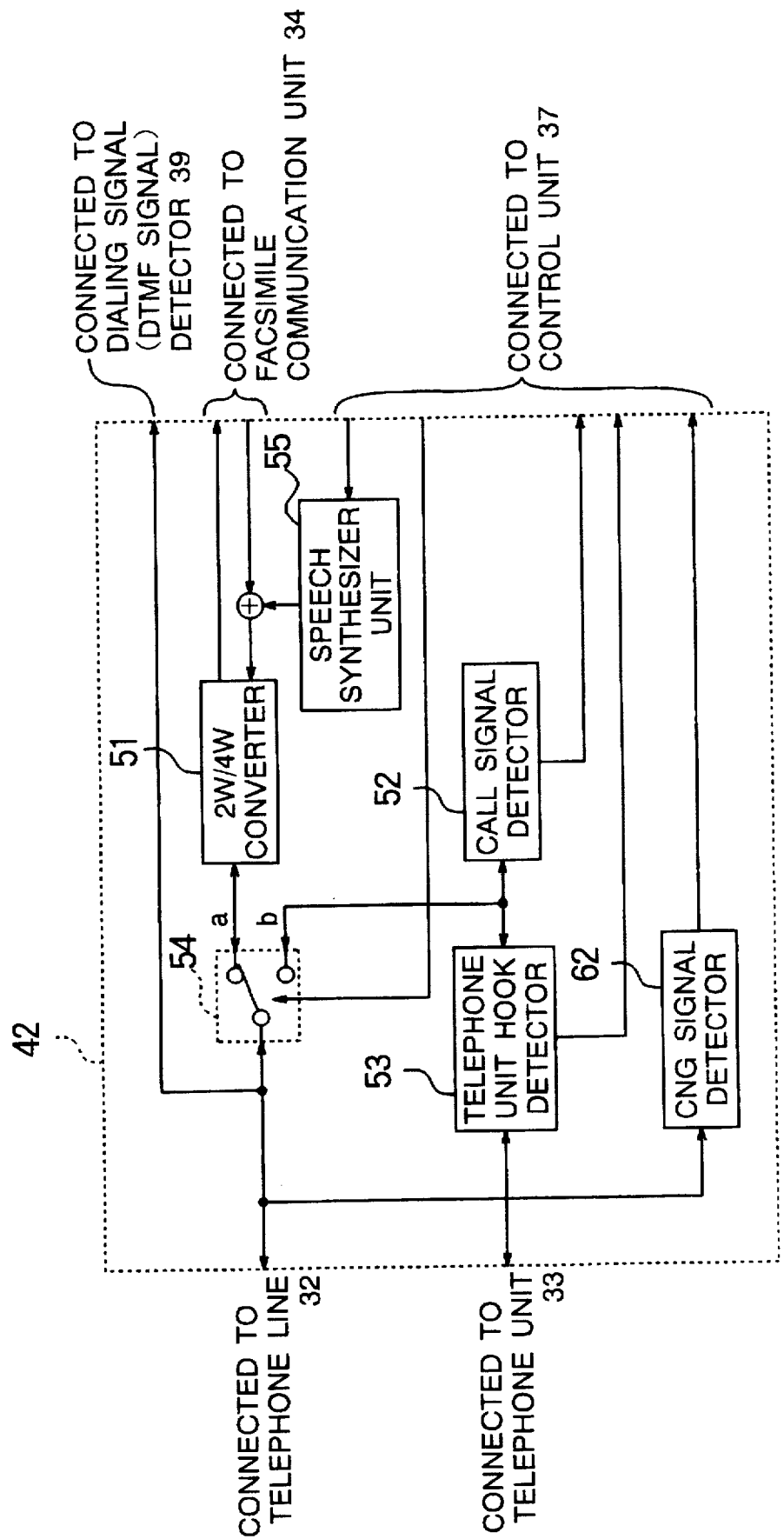
FIG. 4 shows a configuration of a NCU in the facsimile apparatus of FIG. 3.

Turning next to FIG. 4, there is shown a structure of the NCU 42 in FIG. 3. In FIG. 4, a connect modem to line (CML) relay 54 is usually switched to its contact side b and when an interconnection between the facsimile apparatus 31 and telephone line 32 is desired, the switch 54 is switched to its contact side a.

A 2-wire/4-wire converter 51 may be made up usually of a hybrid transformer or the like. A speech synthesizer unit 55 transmits an answering message to the telephone line 32 when it is desired for the facsimile apparatus 31 to perform its automatic responding or answering operation. A call signal detector 52 detects a call signal received from the telephone line 32. A telephone unit hook detector 53 detects whether a handset of the telephone unit 33 is in its off-hook state or on-hook state.

A CNG signal detector 62 detects a CNG signal received from the telephone line 32. The CNG signal refers to a signal which informs the called-side facsimile apparatus of start of facsimile transmission, which will be explained later in more detail.

The CML relay 54 and speech synthesizer unit 55 are controlled by the control unit 37. Outputs of the call signal detector 52, telephone unit hook detector 53 and CNG signal detector 62 are input to the control unit 37.

In the facsimile apparatus 31 of the present embodiment, the operation of the telephone unit 33 in the usual speech mode as well as the operation of the facsimile communication section 34 in the usual facsimile communication mode are substantially the same as those of the prior art facsimile apparatus.

The facsimile apparatus 31 of the present embodiment is designed so that the recorder 36 prints message information including predetermined character string information on the basis of the dialing signal received from the calling-side communication apparatus.

Figure 5:
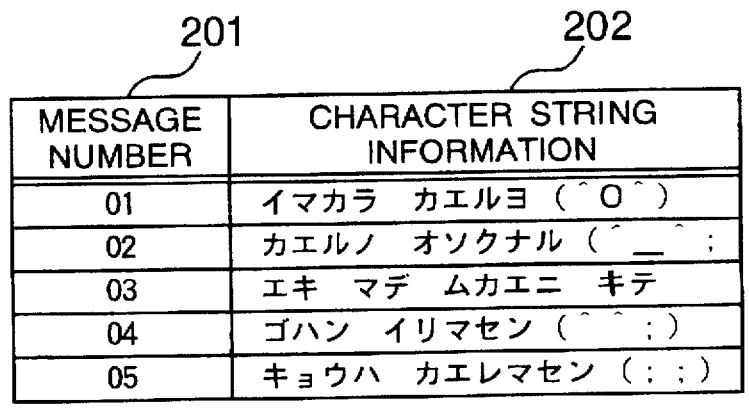
FIG. 5 is a table showing an example of character string information.

FIG. 5 shows character string information contained in message information printable in the facsimile apparatus 31 of the present embodiment. As shown in FIG. 5, the facsimile apparatus 31 of the present embodiment can print the message information containing a plurality (5 in the present embodiment) of types of character string information 202 which in turn are associated with corresponding message numbers 201 uniquely provided. In this connection, the contents of the character string information 202 include, in the present embodiment, Kata-kana characters, symbols, alphabets and numbers.

Here are the meanings of the character string information of the message numbers 01, 02, 03, 04 and 05 shown in FIG. 5. 01: I am coming home, 02: I am late coming home, 03; Pick me up at the station, 04: I don't eat dinner tonight, and 05: I cannot come home today.

Figure 6:
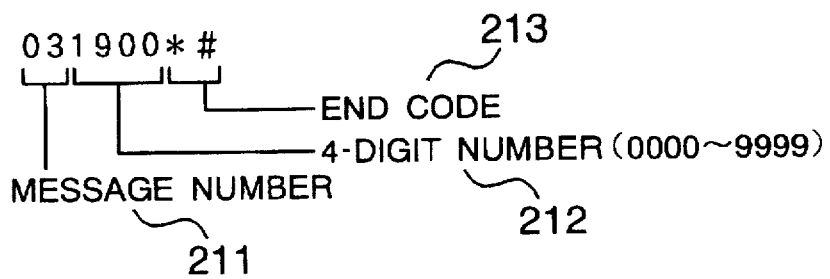
FIG. 6 is a diagram for explaining how a user operates a communication apparatus on a sender side.

Now when the user wants to print message information in the facsimile apparatus 31 of the present embodiment, the user makes a call over the facsimile apparatus 31 of the present embodiment from a tone-signal sendable communication apparatus to put the called facsimile apparatus in such a state that a print instruction of the message information can be operated in a manner to be described later, and then dials as shown in FIG. 6.

In FIG. 6, reference numeral 211 denotes a message number (corresponding to the message number 201 in FIG. 5), 212 denotes a number of 4 digits, and 213 denotes an end code indicative of end of the operation.

As shown in FIG. 6, the user first dials the message number 211 ("03" in the illustrated example) corresponding to desired one of the 5 types of character string information 202 to be printed. Subsequently, the user dials the 4-digit number 212 ("1900" in the illustrated example). As will be explained later, the 4-digit number 212 is printed as it is and in the present embodiment, this 4-digit number 212 indicates a time. Finally, the user dials the end code 213 ("*#" in the illustrated example).

In this conjunction, the tone-signal sendable communication apparatus refers to, e.g., such a telephone set that is connected to a pushphone line or connected to a dial telephone line and has a function of transmitting a tone signal.

Figure 7:
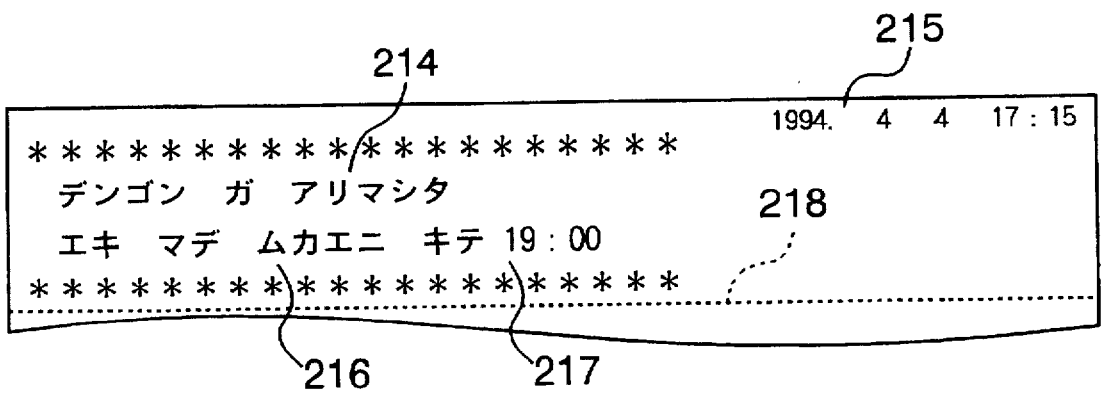
FIG. 7 is a diagram showing an example of printout of message information.

Shown in FIG. 7 is an example of contents of the message information printed in the facsimile apparatus 31 through the operations shown in FIG. 6.

In FIG. 7, reference numeral 214 denotes character string information ("There is a message to you" in the illustrated example) indicating that the facsimile apparatus received an instruction indicative of printout of the message information. Numeral 215 denotes a date 215 at which the facsimile apparatus received the message information print instruction. In the present embodiment, the control unit 37 of the facsimile apparatus 31, which incorporates a clock, can print the date 215 based on the clock.

Numeral 216 denotes character string information corresponding to the message number 211, which refers, in the illustrated example, to "Pick me up at the station" corresponding to the message number "03". Numeral 217 denotes a 4-digit number (corresponding to the 4-digit number 212 in FIG. 6). Since the 4-digit number 212 dialed indicates a time as mentioned above in the present embodiment, the 4-digit number 217 is printed in a time form. When the user omitted to dial the 4-digit number 212 and dials the end code 213 in the operations of FIG. 6, the 4-digit number 217 including ":" is not printed. Numeral 218 denotes a perforation which is printed for a measure of a recording-paper cutting position. In the case where the facsimile apparatus is equipped with a cutter mechanism, the broken line 218 may not be printed and the cutter mechanism may be set to cut the recording paper to a suitable length. In the present embodiment, as shown in FIG. 7, for the purpose of emphasizing the message information, lines of "*" are printed at the upper and lower part of the message information.

FIG. 8 is a character table for use in the present embodiment. In the present embodiment, characters such as alphabets, numbers, Kata-kana characters and symbols are each expressed in terms of a character code consisting of 8 bits.

In FIG. 8, upper 4 of the 8 bits of the character code is expressed by abscissa while lower 4 thereof is by ordinate 209 to express the character code. Hatched areas 210 in the present embodiment means not to be used in the present embodiment. In the character table, for example, the character code of the character "2" is "32 (in hexadecimal notation)" and the character code of the character "M" is "4D (in hexadecimal notation")".

In the present embodiment, the character string information 202 shown in FIG. 5 are actually expressed by some of the character codes shown in FIG. 8 and stored in the character string information storage 40 of FIG. 3.

For example, the character string information 202 corresponding to the message number 201 of "01" in FIG. 5 is expressed by character codes 203 as shown in FIG. 9. More specifically, based on the character table of FIG. 8, the first character " ｲ" has the character code of "B2 (in hexadecimal notation)", the second character " ｱ" has the character code of "CF (in hexadecimal notation)", . . . . and the last character ")" has the character code of "29 (in hexadecimal notation)". In this way, the character string information 202 corresponding to the message number 201 of "01" is stored in the character string information storage 40 actually in the form of the character codes 203 of "B2CFB6D720B6B4D9D6285F4F5F29".

As mentioned above, characters such as alphabets, numbers, Kata-kana characters and symbols are each expressed in terms of a character code in the present embodiment. In actual situations, however, such a character code is developed or converted into a character pattern of 5 dots (horizontal)×7 dots (vertical) (35 dots in total) to be printed as image information. In the facsimile apparatus 31, however, the recorder 36 comprises usually a line type of thermal printer where printing is carried out on a line-by-line basis. For this reason, the control unit 37 is required to issue print data to the recorder 36 on line-by-line basis. In other words, when it is desired to print a character pattern as image information, it is necessary for the control unit 37 to sequentially output to the recorder 36 parts of lines of the character pattern to be printed as print data.

To this end, with respect to a character pattern 205 corresponding to a character code 204, character information 206 is defined as data of 7 lines (corresponding 7 dots in vertical direction) each having 5 dots in horizontal direction, black ones of the dots indicating "1" while white ones thereof indicating "0", as shown in FIG. 10.

FIG. 10 shows an example of the character pattern 205 corresponding to the character code 204 ("B2" in this example) of the character " ｲ" and the associated character information 206. More in detail, of the character information 206 corresponding to the character code 204 of the character " ｲ", the first line data is "01 (in hexadecimal notation)", the second line data is "02 (in hexadecimal notation)", the third line data is "04 (in hexadecimal notation)", the fourth line data is "0C (in hexadecimal notation)", the fifth line data is "14 (in hexadecimal notation)", the sixth line data is "04 (in hexadecimal notation)", and the seventh line data is "04 (in hexadecimal notation)".

In the present embodiment, in actual, the character information 206 defined with respect to the character patterns 205 corresponding to the character codes 204 of all characters shown in FIG. 8 are stored in the formatted character pattern storage 11 of FIG. 3.

And when the control unit 37 informs the character information storage 41 of a character code of a character to be printed and a line number to be printed in order to obtain print data to be output in the recorder 36, the character information storage 41 outputs to the control unit 37 corresponding line number data of the previously-stored character information 206 corresponding to the informed character code. For example, when the character information storage 41, when informed of the character code 204 of "B2" and the line number of "4" by the control unit 37, outputs to the control unit 37 the fourth line data ("0C" (in hexadecimal notation)) of the character information 206 corresponding to the character code 204.

Figure 11:
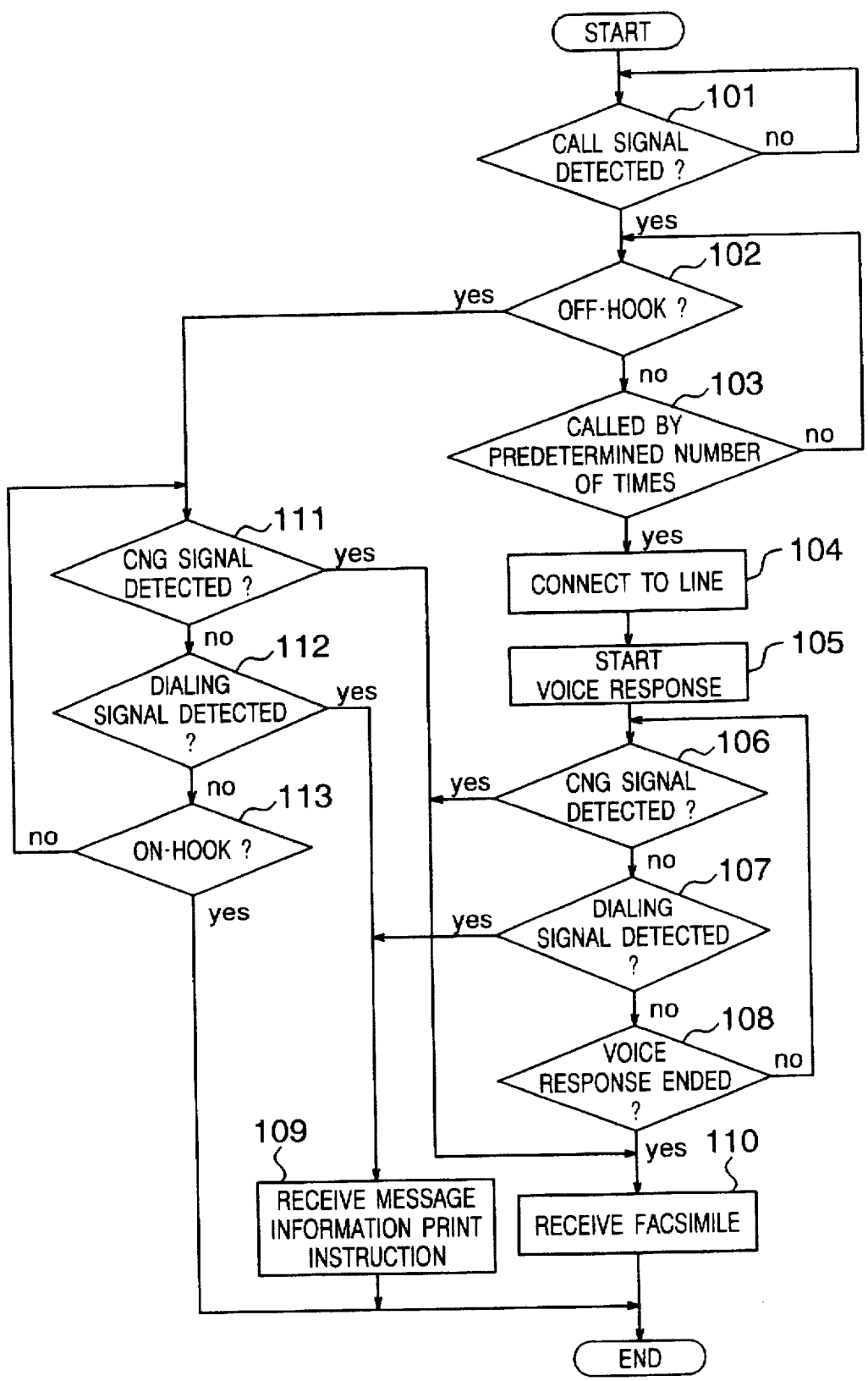
FIG. 11 is a flowchart for explaining the operation of the facsimile apparatus of the present embodiment.

Explanation will next be made as to the operation of the facsimile apparatus 31 of the present embodiment by referring to FIG. 11 showing a flowchart for explaining the operation of the facsimile apparatus 31.

In the facsimile apparatus 31, more in detail, the call signal detector 52 of the NCU 42 usually checks a call signal was received from the telephone line 32 under the control of the control unit 37 (step 101). When detecting the call signal sent from the telephone line 32, the call signal detector 52 informs the control unit 37 of the detection of the call signal.

The control unit 37, when informed of the call signal detection by the call signal detector 52, controls the telephone unit hook detector 53 of the NCU 42 to check whether or not the handset of the telephone unit 33 was put in the off-hook state (step 102). When detecting the off-hook state of the handset of the telephone unit 33, the telephone unit hook detector 53 informs the control unit 37 of the detection of the off-hook state.

The control unit 37 continues to check the presence or absence of the off-hook state of the handset of the telephone unit 33 until the call signal detector 52 detects the call signal by a predetermined number of times, i.e., until the ringing of a bell of the telephone unit 33 is completed by the predetermined number of times (step 103). After the completion of the ringing of the bell of the telephone unit 33 by the predetermined number of times, no detection of the off-hook state of the handset of the telephone unit 33 causes the program to advance to a step 104 for automatic answering. Detection of the off-hook state of the handset of the telephone unit 33 before the completion of the bell ringing by the predetermined number of times causes the program to go to a step 111.

Explanation will first be made as to the case where, even after the completion of the ringing of the bell of the telephone unit 33 by the predetermined number of times, the off-hook state of the handset of the telephone unit 33 was not detected.

In this case, the control unit 37 first controls the CML relay 54 of the NCU 42 to set the CML relay 54 at the contact side a to achieve interconnection between the facsimile apparatus 31 and telephone line 32 (step 104). Subsequently, the control unit 37 controls the speech synthesizer unit 55 of the NCU 42 to start transmission of an answering message (step 105). The answering message has such contents as to inform the user of the calling-side communication apparatus of the absence of the called-side user, and in case of the facsimile reception, to inform the user of the calling communication apparatus of the fact that the reception is possible, e.g., saying "I am out now. For telephone, please call again later. For facsimile communication, please continue your transmission."

Then the control unit 37 controls the call signal detector 52 of the NCU 42 while sending an answering message to the telephone line 32 to check the presence or absence of reception of a CNG signal from the telephone line 32 (step 106), and also controls the dialing signal detector 39 to check the presence or absence of reception of a dialing signal from the telephone line 32 (step 107).

The call signal detector 52 of the NCU 42, when detecting the CNG signal received from the telephone line 32, informs the control unit 37 of the reception of the CNG signal; whereas, the call signal detector 52, when receiving the dialing signal from the telephone line 32 during the transmission of the answering message, informs the control unit 37 of the detection of the dialing signal.

When the control unit 37 is informed of the detection of the CNG signal by the call signal detector 52, this means that the calling-side communication apparatus is going to start the facsimile transmission. Thus, the facsimile apparatus goes to a step 110 for facsimile reception.

When the control unit 37 is informed of the detection of the dialing signal by the dialing signal detector 39, this means that the calling-side communication apparatus is going to transmit a message information print instruction. Thus, the facsimile apparatus goes to a step 109 to receive the message information print instruction. The details of the operation of the step 109 will be explained later.

When the control unit 37 fails to be informed of the CNG signal detection by the call signal detector 52 and also fails to be informed of the dialing signal detection by the dialing signal detector 39 until the transmission of the response message is completed (step 108), the facsimile apparatus goes to the step 110 for the facsimile reception.

In the step 110, the facsimile communication section 34 and recorder 36 are controlled for the facsimile reception, the operation of which is substantially the same as that of the conventional facsimile apparatus.

When the calling-side communication apparatus is an automatic transmission type facsimile apparatus, the aforementioned CNG signal is surely transmitted therefrom; whereas, when the calling-side communication apparatus is a manual transmission type facsimile apparatus, the CNG signal is not always transmitted therefrom. To avoid this, basically, the called-side facsimile apparatus transmits a control signal faster than the calling-side one in the facsimile communication. The CNG signal plays a role in prompting the transmission of this control signal.

Accordingly, when the facsimile apparatus proceeds to the step 110 for the facsimile reception after completing the transmission of the answering message, the facsimile apparatus can surely carry out the facsimile reception even when the calling-side communication apparatus is a manual transmission type facsimile apparatus (which cannot transmit the CNG signal). Note that after completion of the facsimile reception in step 110, the CML relay 54 of the NCU 42 is thrown to the contact side b to disconnect the interconnection between the facsimile apparatus 31 and the telephone line 32.

Explanation will then be made as to the operation of the facsimile apparatus when the handset of the telephone unit 33 is put in the off-hook state before the completion of ringing of the telephone unit 33 by a predetermined number of times.

This means that the user of the facsimile apparatus 31 picks up the handset of the NCU 42. Thus, the control unit 37 first controls the call signal detector 52 of the NCU 42 to check the presence or absence of reception of the CNG signal from the telephone line 32 (step 111), and also controls the dialing signal detector 39 to check the presence or absence of reception of the dialing signal from the telephone line 32 (step 112).

The call signal detector 52 of the NCU 42, when detecting the CNG signal received from the telephone line 32, informs the control unit 37 of the detection of the CNG signal; while the dialing signal detector 39, when detecting the dialing signal received from the telephone line 32, informs the control unit 37 of the detection of the dialing signal.

When the control unit 37 is informed of the detection of the CNG signal by the call signal detector 52, this means that the sender-side communication apparatus is going to start the facsimile transmission and thus the facsimile apparatus proceeds to the step 110 for the facsimile reception.

When the control unit 37 is informed of the detection of the dialing signal by the dialing signal detector 39, this means the calling-side communication apparatus is going to transmit a message information print instruction and thus the facsimile apparatus goes to the step 109 to receive the message information print instruction. In this case, prior to going to the step 109, the control unit 37 controls the CML relay 54 of the NCU 42 to set the CML relay 54 at the contact side a to establish interconnection between the facsimile apparatus 31 and telephone line 32. As a result, the facsimile apparatus is put in the same state as when it went from the step 107 to the step 109.

And when the control unit 37 fails to be informed of the detection of the CNG signal by the call signal detector 52 and also fails to be informed of the detection of the dialing signal by the dialing signal detector 39, before the control unit 37 is informed of the detection of the off-hook state of the handset of the telephone unit 33 by the telephone unit hook detector 53 of the NCU 42, i.e., before the user of the telephone unit 33 of the facsimile apparatus 31 replaces the handset of the telephone unit 33 (step 113), the facsimile apparatus terminates the operation as it is.

Figure 12:
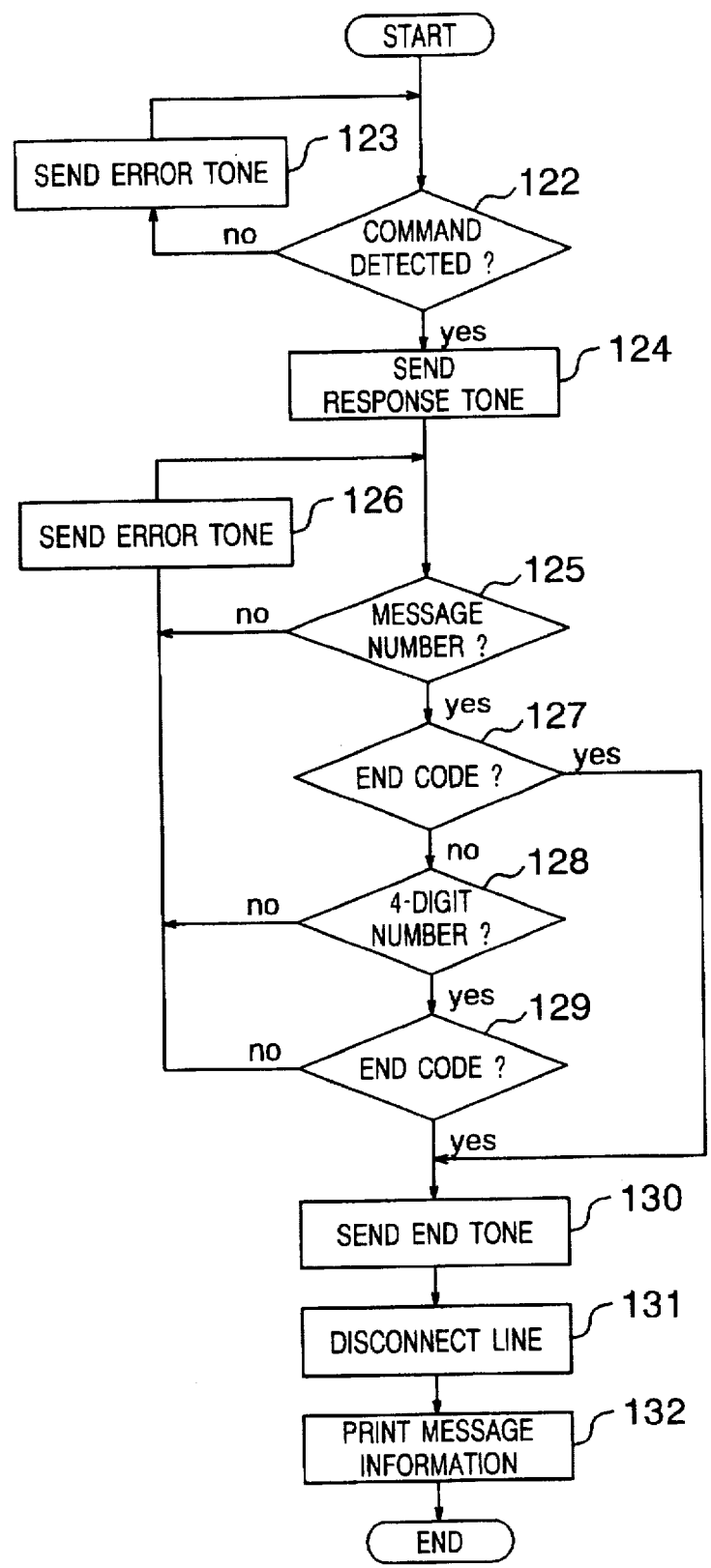
FIG. 12 is a flowchart for explaining for explaining the receiving operation of a print instruction of message information.

FIG. 12 is a flowchart for explaining the operation of the step 109. In the following description, it is assumed that the 5 sorts of character string information 202 shown in FIG. 5 are previously stored in the character string information storage 40 and such operation as shown in FIG. 6 has been carried out.

In the step 107 or 112 of FIG. 11, when the control unit 37 is informed of the detection of the dialing signal by the dialing signal detector 39, the control unit 37 examines whether or not the dialing signal is a command (step 122).

The present embodiment is designed so that, only when the facsimile apparatus receives a command for enabling the operation of the message information print instruction from the calling-side communication apparatus, the message information print instruction is enabled and the facsimile apparatus accepts the message information print instruction. In the present embodiment, the command is constituted of a predetermined 4-digit number.

Therefore, only when the control unit 37 determines in the step 122 that the dialing signal detected by the dialing signal detector 39 is the predetermined 4-digit number as a command, the facsimile apparatus goes to a step 124; whereas, otherwise (for example, when the dialing signal is a 4-digit number different from the predetermined 4-digit number as a command or when the dialing signal detector 39 fails to detect the 4-digit number within a predetermined time), the facsimile apparatus transmits an error tone (step 123) and again returns to the step 122 to wait for the next command. In this connection, the control unit 37 controls the speech synthesizer unit 55 of the NCU 42 to transmit the error tone. The error tone may be a beep alarm tone or may be replaced by such a voice response as, e.g., "wrong command".

In the step 124, the control unit 37 controls the speech synthesizer unit 55 of the NCU 42 to transmit a response tone. In this connection, the response tone may be a beep alarm tone or may be replaced by such a voice response as, e.g., "operation accepted", as in the above case.

After this, the control unit 37 controls the dialing signal detector 39 to detect the presence or absence of reception of a dialing signal conforming to the operation of FIG. 6.

That is, the control unit 37 first detects the presence or absence of reception of a message number from the calling side (step 125). Since it is assumed in the present embodiment that the 2-digit message number is first transmitted as shown in FIG. 6, only when the control unit 37 detects the message number, the facsimile apparatus proceeds to a step 127. When the control unit 37 fails to detect the message number (for example, when the control unit 37 detected a 2-digit dialing signal which number does not indicate a message number or when the control unit 37 fails to detect the 2-digit dialing signal within a predetermined time), the control unit 37 transmits the error note (step 126) and the facsimile apparatus returns back to the step 125 to wait for the detection of the next message number. The control unit 37 controls the speech synthesizer unit 55 of the NCU 42 to transmit the error tone.

Subsequently, the control unit 37 detects the presence or absence of reception of an end code following the message number (step 127) and also detects the presence or absence of reception of a 4-digit number (step 128). As mentioned above, the present embodiment can transmit a 4-digit number following the message number. When the transmission of the 4-digit number is unnecessary, however, the message number may be followed by the end code ("*#" in this example).

When the control unit 37 detects the end code in the step 127, the facsimile apparatus goes to a step 130; while, when the control unit 37 detects the 4-digit number in the step 128, the facsimile apparatus goes to a step 129. In the step 129, the control unit 37 examines whether or not the end code is received following the 4-digit number.

The control unit 37, when failing to detect the 4-digit number in the step 128, i.e., when detecting the message number followed by a dialing signal (e.g., "##") other than the end code and 4-digit number, transmits the error tone (step 126) and then returns back to the step 125 to wait for the detection of the next message number. Even when detecting a dialing signal other than the end code in the step 129, the control unit 37 transmits the error tone (step 126) and then returns back to the step 125 to wait for the detection of the next message number.

In this way, in the present embodiment, even when the user of the calling-side communication apparatus wrongly operated, i.e., the facsimile apparatus 31 transmitted the error tone, the user can retry his/her input operation of the message number.

When the control unit 37 detects all the dialing signals correctly, the control unit 37 transmits an end tone (step 130). The control unit 37, when controlling the speech synthesizer unit 55 of the NCU 42 as in the above error tone or response tone, transmits the end tone. The end tone is used to inform the user of the calling-side communication apparatus that the message information print instruction was correctly accepted.

After completing the transmission of the end tone, the control unit 37 controls the CML relay 54 of the NCU 42 to set the CML relay 54 at the contact side b to provide disconnection between the facsimile apparatus 31 and telephone line 32 (step 131) to print the message information (step 132).

In the step 132, the control unit 37 first print the current time with such a date 215 as shown in FIG. 7. After completing the printing of the date 215, the control unit 37 prints characters "*" as arranged to form a line as a delimiter, and then prints the character string information 214 indicative of reception of the message information print instruction, the character string information 216 corresponding to the detected message number and the detected 4-digit number 217. In this connection, the 4-digit number 217 is printed in a time form, that is, of 2-digit hour and minute delimited by a symbol ":". Subsequently, characters "*" are printed as a line and finally a broken line 218 is printed.

The printing of the message information is carried out by utilizing such character information 206 as shown in FIG. 10. For example, when it is desired to print the date 215, the control unit 37 acquires from the character information storage 41 numbers indicative of the date 215 and the character information 206 corresponding to the character code of the symbol ":".

As mentioned above, it is necessary for the control unit 37 to output print data to the recorder 36 on a line-after-line basis. For example, when it is desired to the date 215, the control unit 37 outputs to the recorder 36 as the print data of the first line data out of the character information 206 acquired with respect to the all the character codes indicative of the date 215, and then outputs the second line data, third line data, and so on sequentially as the print data to the recorder 36. In this conjunction, as to how to arrange the recorder 36, there may be considered various types of recorders other than the line printer and these recorders are already put in their practical use. For this reason, detailed explanation thereof will be omitted.

Figure 13:
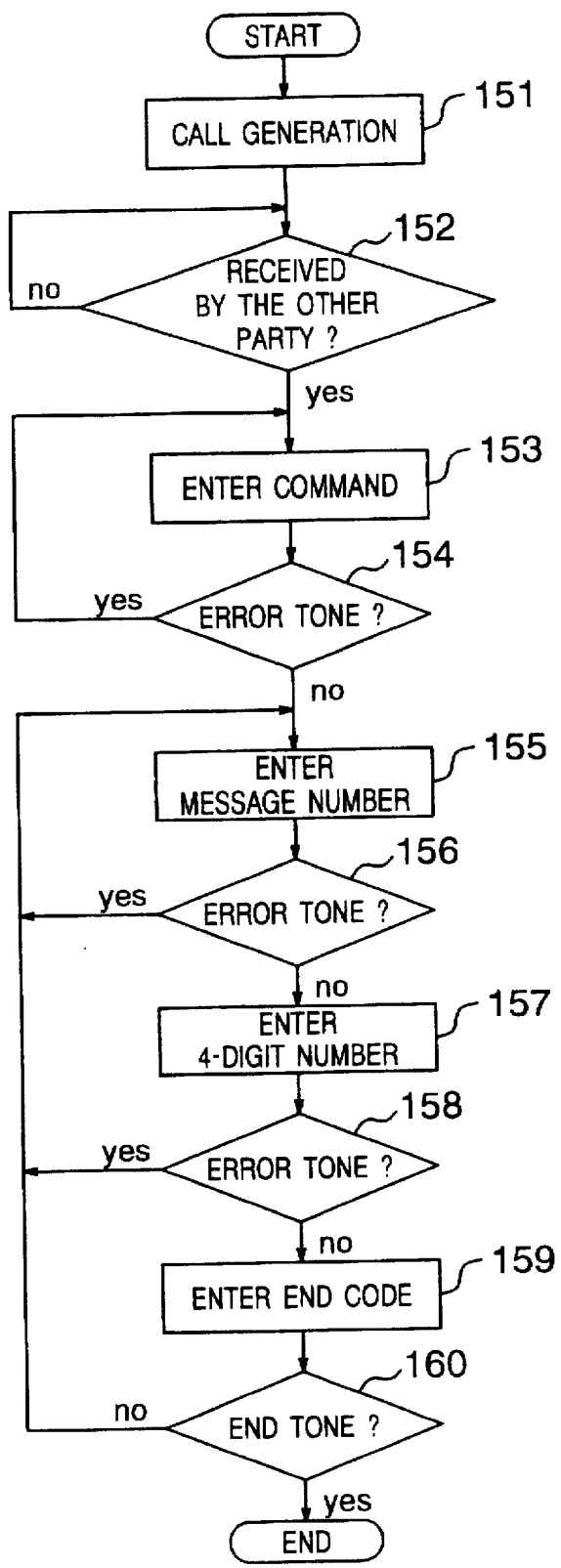
FIG. 13 is a flowchart for explaining a user operating procedure of the sender-side communication apparatus.

Explanation will next be made as to the how the user operates the calling-side communication apparatus in connection with FIG. 13.

In the calling-side communication apparatus, the user first makes a call to the facsimile apparatus 31 of the present embodiment (step 151) to wait until the facsimile apparatus 31 receives an incoming call (step 152).

In the present embodiment, there are two ways of receiving an incoming call, that is, when the user of the facsimile apparatus 31 picks up the handset of the telephone unit 33 to answer the call and when the facsimile apparatus 31 automatically answers the call because the ringing of the bell of the telephone unit 33 by a predetermined number of times resulted in non-detection of its off-hook state, as mentioned above.

When the call is received at the called facsimile apparatus 31, the calling user enters such a command as to put the message information print instruction in the operable state from the calling-side communication apparatus (step 153). In the present embodiment, since the command is a predetermined 4-digit number as mentioned above, the user dials the number as it is.

In this connection, if the facsimile apparatus 31 fails to normally receive the command due to the wrong command or the noise of the telephone line 32 or the like, then the calling-side communication apparatus receives an error tone from the called side (step 154). The then operations of the facsimile apparatus 31 correspond to the operations of the steps 122 and 123 in FIG. 12. When the calling user enters the command and then receives the error tone from the called side, the calling user again enters the command in the step 153.

In the step 154, if the calling user fails to receive the error tone, that is, if he/she receives a response tone, then he/she subsequently enters a message number (step 155).

Even in this case, when the facsimile apparatus 31 fails to normally receive the message number, the calling user receives the error tone from the called party (step 156). The then operations of the facsimile apparatus 31 correspond to the operations of the steps 125 and 126 in FIG. 12. If the calling user enters the message number and receives the error tone from the called party, then he/she again enters the message number in the step 155.

When the calling user fails to receive the error tone in the step 156, he/she subsequently a 4-digit number (step 157).

Even in this case, when the facsimile apparatus 31 fails to normally receive the 4-digit number, the calling user receives the error tone therefrom (step 158). The then operations of the facsimile apparatus 31 correspond to the operations of the steps 128 and 126 in FIG. 12. In this case, the calling user again enters the 4-digit number and when receives the error tone from the called party, the calling user again enter the message number back in the step 155.

When the calling user fails in the step 158 to receive the error tone from the called party, the user subsequently enters the end code (step 159).

When the facsimile apparatus 31 was able to normally receive the end code, the calling user can receive an end tone (step 160). The then operations of the facsimile apparatus 31 correspond to the operations of the steps 129 and 130 in FIG. 12. When the facsimile apparatus 31 fails to normally receive the end code, the apparatus 31 sends not the end tone but the error tone (step 156). The then operations of the facsimile apparatus 31 correspond to the operations of the steps 129 and 126 in FIG. 12. After entering the end code, when the calling user receives the error tone, the calling user again enters the message number back in the step 155.

When the calling user receives the end tone in the step 160, this means that the message information print instruction was correctly accepted by the called party and thus the entering operation is completed.

The predetermined character string information 202 is previously stored in the character string information storage 40 in the present embodiment.

However, when the character string information storage 40 comprises a nonvolatile, recordable memory, the user of the facsimile apparatus 31 can record message numbers and character string information associated therewith in the memory through user's operation of the operating unit 38.

As mentioned above, the facsimile apparatus 31 of the present embodiment previously stores a plurality of character string information and message numbers (numbers) associated therewith. Accordingly, when communication utilizes dialing signals of tone signals and the facsimile apparatus 31 of the present embodiment is used as a called-side communication apparatus, character string information corresponding to a number indicated by the dial signal sent from the calling-side communication apparatus can be printed in the facsimile apparatus 31. Further, the character string information may include many sorts of characters such as Kata-kana characters, symbols, alphabets and numbers.

The user of the calling-side communication apparatus is required only to conduct such a simple operation as to enter merely a message number corresponding to desired character string information, with a less amount of information of the dialing signal sent from the calling-side communication apparatus.

Further, the user of the calling-side communication apparatus can enter, in addition to the message number, a 4-digit number, not only the character string information but also time information are added and printed in the facsimile apparatus 31 of the present embodiment.

In the present embodiment, the user of the calling-side communication apparatus is designed to select desired one of the character string information previously stored in the character string information storage 40 and to enter a message number corresponding to the selected character string information. However, when 2 or more character string information may be selected through a single operation. In the latter case, when the user of the calling-side communication apparatus combines 2 or more character string information, more contents can be transmitted to the user of the facsimile apparatus 31.

In such a case, how to store character string information becomes different from the aforementioned method. That is, to be able to combine 2 or more character string information, the contents of the character string information is required to be defined on a clause basis.

More in detail, the character string information storage 40 previously stores a plurality (8 in this example) of sorts of character string information 222 and message numbers 221 uniquely attached to the respective character string information 222, as shown in FIG. 14.

Here are the meanings of the respective character string information corresponding to the message numbers 01–23 in FIG. 14.

01: Today, 02: Tomorrow, 03: Tonight, 11: At my office, 12: At the station, 21: Come and get me, 22: I will come home late, and 23: I do not have dinner.

Further, how the user of the calling-side communication apparatus also becomes different from the aforementioned method. That is, to be able to combine 2 or more message numbers, the sender user is required to enter 2 or more message numbers.

More in detail, the calling user first dials the message number 221 corresponding to the character string information 222 to be printed or the message numbers 221 corresponding to 2 or more combined character string information 222 indicative of desired contents to be printed, as shown in FIG. 15. In the example of FIG. 15, the contents to be printed is "Come and get me at my office today", a message number 223 is a 6-digit number consisting of 3 message numbers 221 ("01", "11" and "21" in this example).

In order to freely set the number of character string information 222 to be combined, it is assumed in this example that the user should put or dial a delimiter 226 ("*" in this example) at the end of the combined character string information 222.

Subsequently, the user dials a 4-digit number 225 ("1900" in this example) and finally dials an end code 224 ("*#" in this example) indicative of end of the operation.

FIG. 16 shows the contents of message information printed in the facsimile apparatus 31 through the user's operations of FIG. 15.

In FIG. 16, reference numeral 231 denotes character string information ("There is a message to you") indicative of reception of a message information print instruction, numeral 228 denotes a date at which the message information print instruction was received, 232 denotes a perforation printed as a measure of a recording-paper cutting position.

Numeral 229 denotes character string information corresponding to the message number 223 and when 2 or more character string information are combined, the combined character string information are printed to form a single sentence as a whole. In this example, the character string information 229, which consists of the message numbers of "01", "11" and "21", refers to "Come and get me at my office today".

Numeral 230 denotes a 4-digit number (corresponding to the 4-digit number 225 in FIG. 15) which is printed in a time format even in the example of FIG. 16. In the operations shown in FIG. 15, when the user fails to dial the 4-digit number 225 and dials the end code 224, the 4-digit number 230 will not printed including the symbol ":".

Even in the example of FIG. 16, for the purpose of emphasizing the message information, a line of "*" is printed respectively above and below the message information as line delimiters.

The operation of the facsimile apparatus 31 is designed so that the 4-digit number 223 is detected before the delimiter 226 is detected and the character string information 222 corresponding to detected message number 223 of all the message numbers 221.

In place of character string information, image information may also be previously stored in the facsimile apparatus 31 to be printed.

Figure 17:
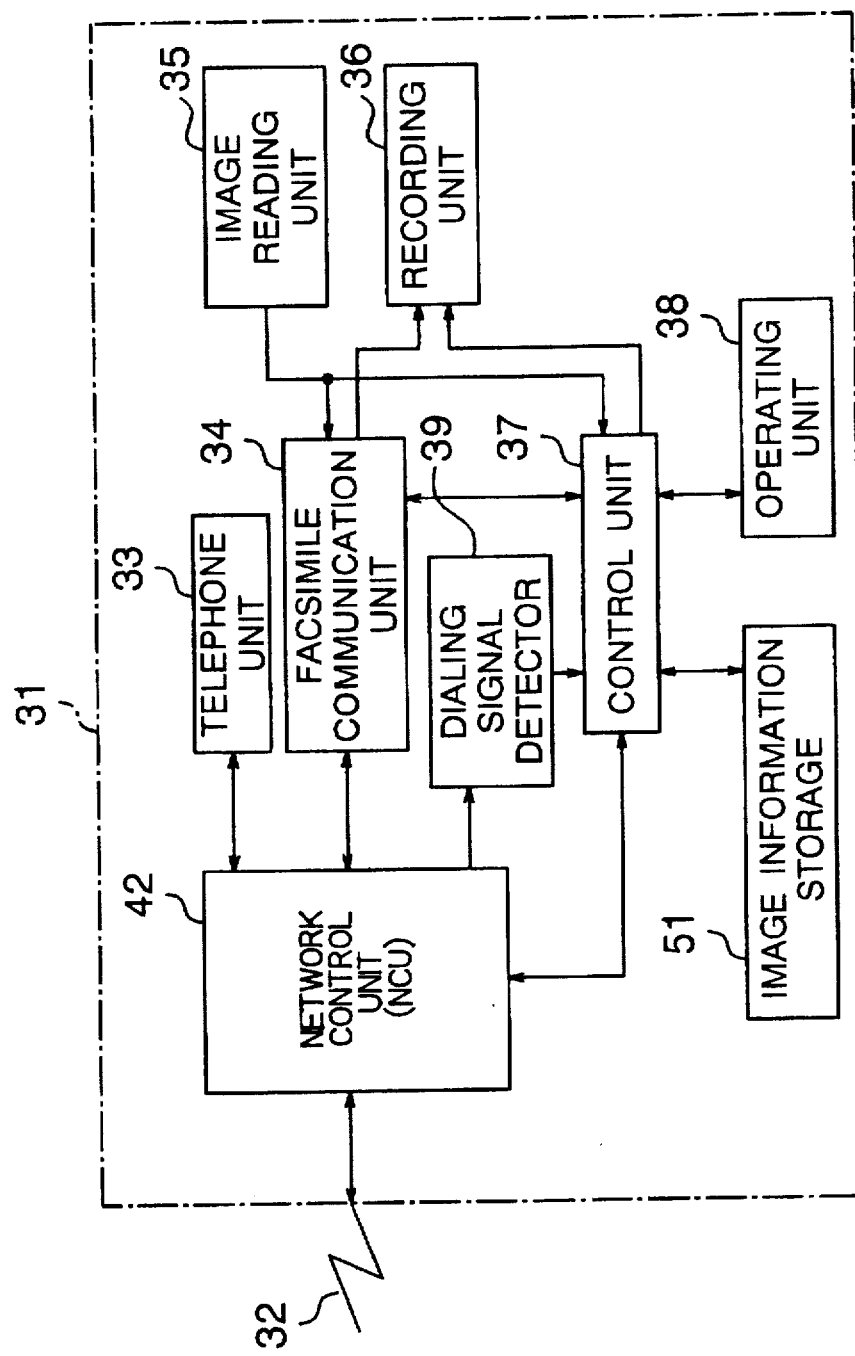
FIG. 17 is a block diagram of an arrangement of a facsimile apparatus in accordance with a further embodiment of the present invention.

In this case, the facsimile apparatus 31 is required to be structured as shown in FIG. 17. That is, the character string information storage 40 and the character information storage 41 are replaced by an image information storage 51, as shown in FIG. 17.

The image information storage 51 previously stores image information included in message information printable in the facsimile apparatus 31.

More specifically, the image information storage 51 previously stores a plurality (2 in this example) of sorts of image information 242 and message numbers 241 uniquely attached to the respective image information 242, as shown in FIG. 18. The image information of the message number 01 means "I'm sorry, I don't eat", while the image information of the message number 02 means "Come and get me by . . . o'clock by car at the bus stop".

In this connection, the image information 242 may comprise image information read out by the image reading unit 35 from an original document prepared by the user of the facsimile apparatus 31. This can be realized by arranging the facsimile apparatus 31 so that the control unit 37 controls the image reading unit 35 to read out the image information read out from the original document prepared by the user of the facsimile apparatus 31 and to store the read-out image information in the image information storage 51 in association with the corresponding message numbers 241.

How the user of the calling-side communication apparatus operate the apparatus is substantially the same as the operating method shown in FIG. 6, but the contents of the message information printed in the facsimile apparatus 31 through the user's operations is as shown in FIG. 19.

In FIG. 19, reference numeral 246 denotes a date at which the message information print instruction is received, and numeral 247 denotes a perforation which is printed as a measure of a recording-paper cutting position.

Numeral 245 denotes image information corresponding to the message number 241 which corresponds to the image information "02" in the illustrated example.

Numeral 243 denotes a 4-digit number which is printed in a time format even in the example of FIG. 19. The 4-digit number 243 is printed at a predetermined location. In the example of FIG. 19, the image information 245 is the one read out from the original document prepared by the user in the form of the 4-digit number 243 of a time format.

As has been explained in the foregoing, the facsimile apparatus of the present embodiment previously stores a plurality of character string information associated with corresponding message numbers (numerals). Therefore, in such communication as to utilize dialing signals based on tone signals, when the facsimile apparatus of the present invention is used as a called-side communication apparatus, the called-side communication apparatus can print character string information corresponding to numbers indicated by dialing signals received from the calling-side communication apparatus. Further, the character string information may include many sorts of characters such as Kata-kana characters, symbols, alphabets and numbers.

In addition, the user of the calling-side communication apparatus is required only to conduct such a simple operation as to enter a number corresponding to desired character string information, resulting in less amount of information of the dialing signal transmitted from calling-side communication apparatus.

Figure 22:
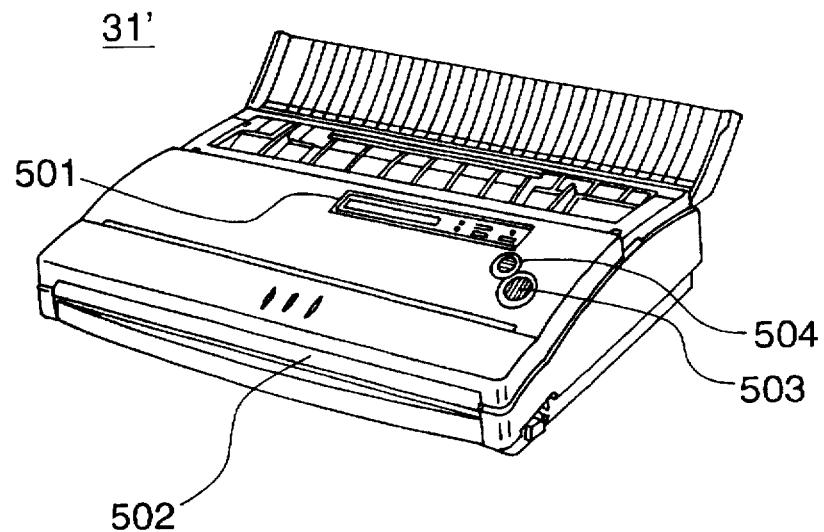
FIG. 22 shows an appearance of the facsimile apparatus of the embodiment of the present invention.

Shown in FIG. 22 is an appearance view of a facsimile apparatus 31 in accordance with another embodiment of the present invention. The facsimile apparatus 31' of the present embodiment is connected to an external telephone set, which will be explained later more in detail. Thus the facsimile apparatus 31' has no telephone function unit built therein. Reference numeral 501 denotes a liquid crystal display unit for displaying thereon the state of the facsimile apparatus, a simple operating method, and various sorts of information in the facsimile communication. Numeral 502 denotes a recording-paper discharger from which printed recording papers are discharged when the printing operation of the facsimile apparatus 31' is carried out. The facsimile apparatus of the present embodiment has no automatic cutting function of automatically cutting the recording papers, and thus after the recording papers are discharged, the user of the facsimile apparatus must cut the discharged recording papers by himself or herself. Numeral 503 denotes a start button which is used when the user wants to start various operations of the facsimile apparatus 31', and 504 denotes a stop button which is used when the user wants to interrupt or stop the operation of the facsimile apparatus 31'. The basic operations of the facsimile apparatus of the present embodiment are designed to be effected with use of the start button 503 and stop button 504. For example, when the facsimile apparatus 31' is used to perform facsimile transmission, the user sets an original document or documents to be transmitted to the facsimile apparatus 31', and makes a call to the transmission destination with use of the telephone set connected to the facsimile apparatus 31'. After the called party gets ready for the facsimile reception, the calling user pushes the start button 503. This causes the facsimile transmission to start. When the calling user wants to stop transmission during the facsimile transmission, the user pushes the stop button 504. When it is desired for the facsimile apparatus 31' to perform the facsimile reception, on the other hand, the user of the facsimile apparatus 31' answers a call on the telephone set connected to the facsimile apparatus 31' and then pushes the start button 503. This causes the facsimile apparatus 31' to start the facsimile reception. when the user of the facsimile apparatus 31' pushes the stop button 504 during the facsimile reception as in the facsimile transmission, the facsimile reception is stopped. The detailed operation when the facsimile apparatus receives an incoming call, i.e., when the facsimile apparatus is in its incoming signal reception mode, will be explained later. The functions of the facsimile apparatus which are not related directly to the present invention will not be explained herein.

Figure 23:
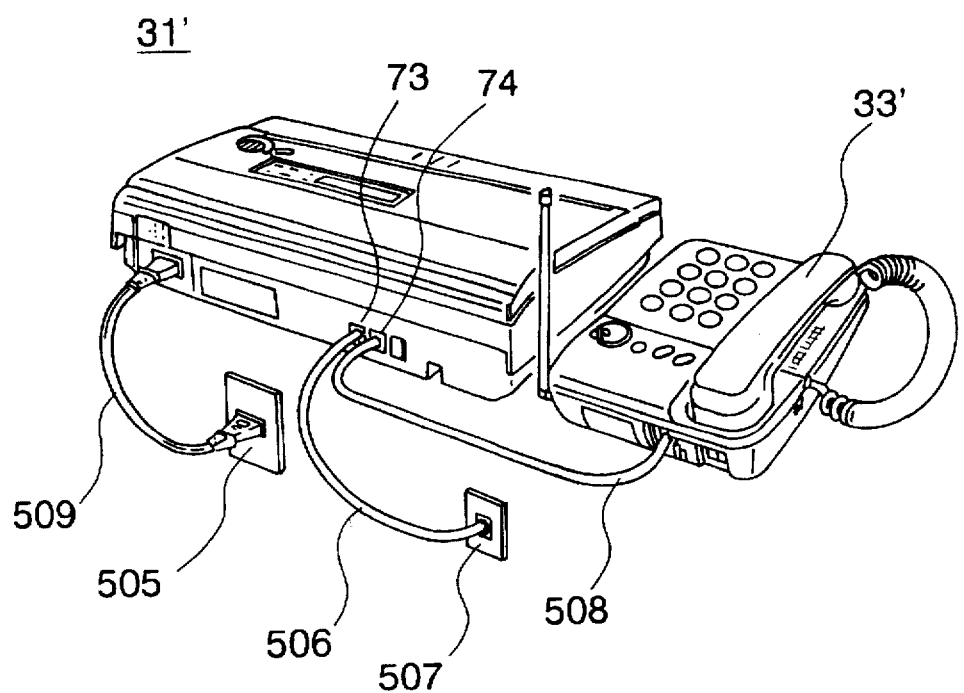
FIG. 23 shows, in a perspective view, wiring of the facsimile apparatus of the embodiment of FIG. 22 to a telephone set.

FIG. 23 shows a wiring view between the facsimile apparatus of FIG. 22 and an external telephone set. Provided at the rear side of the facsimile apparatus 31' are a line connection terminal 73 and a telephone-set connection terminal 74. The line connection terminal 73 is connected with a modular cable 506 at the other end of which is connected to an home or office telephone line terminal 507. The telephone line terminal 507 in turn is connected to a telephone line. The telephone-set connection terminal 74 of the facsimile apparatus 31' is connected with an external telephone set 33'. When it is desired to use the telephone set 33' independently, a line connection terminal 508 of the telephone set 33' is usually connected to the telephone line. When it is desired to connect the telephone set 33' to the facsimile apparatus 31', the line connection terminal 508 of the telephone set 33' is connected to the telephone-set connection terminal 74 of the facsimile apparatus 31' via the line connection terminal 508. When the facsimile apparatus 31' is connected to the telephone line and then the telephone set 33' is connected to the facsimile apparatus 31' in this way, both of the facsimile communication of the facsimile apparatus 31' and the speech of the telephone set 33' can be controlled through the single telephone line. Reference numeral 509 denotes a power supply cord which is connected to a power supply receptacle 505.

Figure 24:
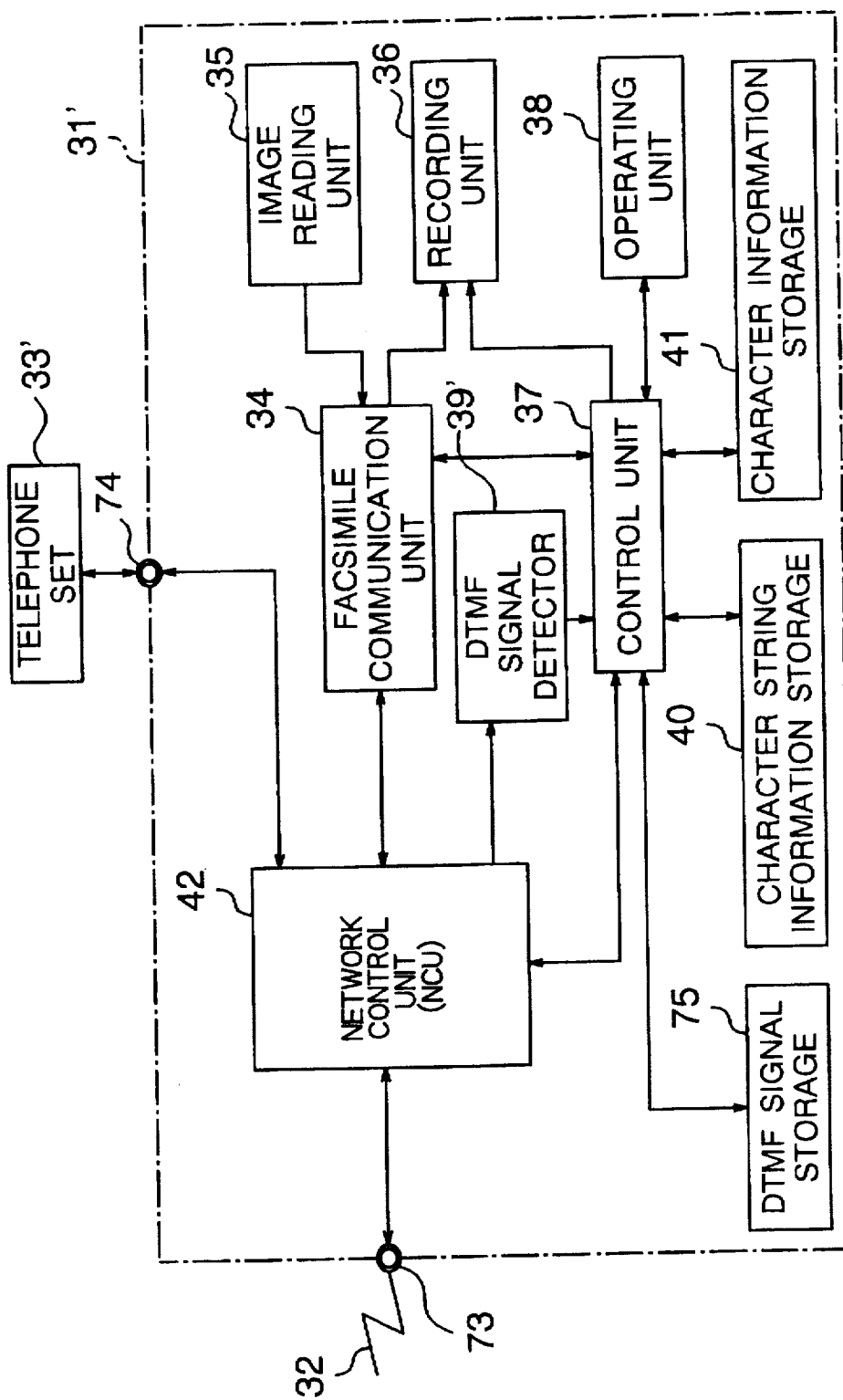
FIG. 24 is a block diagram of an arrangement of the facsimile apparatus of the embodiment of FIG. 22.

FIG. 24 shows a configuration of the facsimile apparatus 31' of FIG. 22. Explanation of the configuration will be focused on parts which are different from the parts of the facsimile apparatus of FIG. 3. As mentioned above, the facsimile apparatus 31' is connected at the line connection terminal 73 to the telephone line 32. The NCU 42 controls interconnections of the facsimile apparatus 31' to the telephone line 32 and telephone set 33' connected to the telephone-set connection terminal 74, the detailed structure of which has been already explained in connection with FIG. 3. The recorder 36 prints facsimile documents received in the facsimile communication or received information communication (which will be explained later). As mentioned above, recording papers recorded in the recorder 36 are discharged from the recording paper discharge port 503. The operating unit 38 is used by the user of the facsimile apparatus 31' to provide various sorts of operations to the facsimile apparatus 31' or to display thereon the state of the facsimile apparatus to inform the user of the state. Mounted on the operating unit 38 in the present embodiment are such start button 503, stop button 504 and liquid crystal display unit 501 as explained in FIG. 22. Reference numeral 75 denotes a DTMF signal storage 75 to be detailed later.

Explanation will then be made as to the specifications of information communication using a DTMF signal in the present embodiment. In the facsimile apparatus of the present embodiment, there are two possible methods of the information communication using the DTMF signal, i.e., one based on "formatted message" and the other based on "unformatted message". In the formatted message information communication, a plurality of formatted messages associated with respective message numbers are previously stored in the facsimile apparatus 31' so that, when receiving a DTMF signal indicative of desired one of the message numbers, the facsimile apparatus 31' prints the indicated message. In the unformatted message information communication, on the other hand, the facsimile apparatus 31' prints a number indicated by a DTMF signal received from the party as it is. That is, cipher communication using numbers is realized. For example, "0906" is used to mean "オ ソレ イル" (I will be late). The cipher communication is also used merely to inform the called party of a telephone number to be contacted.

Turning now to FIG. 27, there is shown a table showing formatted messages for use in the facsimile apparatus of the present embodiment. In the present embodiment, 20 sorts of formatted messages are previously stored in the character string information storage 40 of the facsimile apparatus 31', the storage method of which will be detailed later. In the present embodiment, there are stored 7 sorts of messages as feeling-associated messages 303, 6 sorts of messages as messages 304 associated with meetings by appointment, and 7 sorts of messages as homecoming-associated messages 305. In this connection, the meanings of the messages of message numbers 01 to 20 expressed in Kata-kana characters are as follows. 01: I am sorry, 02: Thank you, 03: Congratulations, 04: I would like to see you, 05: Stick to it, 06: Cheer up, 07: It won't happen again, 08: The plan is suspended, 09: There is no change in the plan, 10: At usual place, 11: At usual time, 12: I will be late, 13: Please call me, 14: I am coming home now, 15: I come home late, 16: I cannot come home today, 17: Come and get me, 18: I eat out, 19: I eat home, and 20: Please dine without waiting for me.

The respective messages are attached with message numbers 301. When it is desired to send a message using a DTMF signal, the calling user specifies desired one of the message numbers 301, which results in the corresponding message being printed in the called party site. Contents 302 of each message refers to the body of the associated message. Take the message number "01" for example. The message contents 302, take an example of the message number "01", is made up of a body part of "ゴ メ ン ナ サ イ (;;)" (I am sorry) and 4-digit number information 307. How to use the 4-digit number information 307 will be explained in the following operating method.

Figure 25:
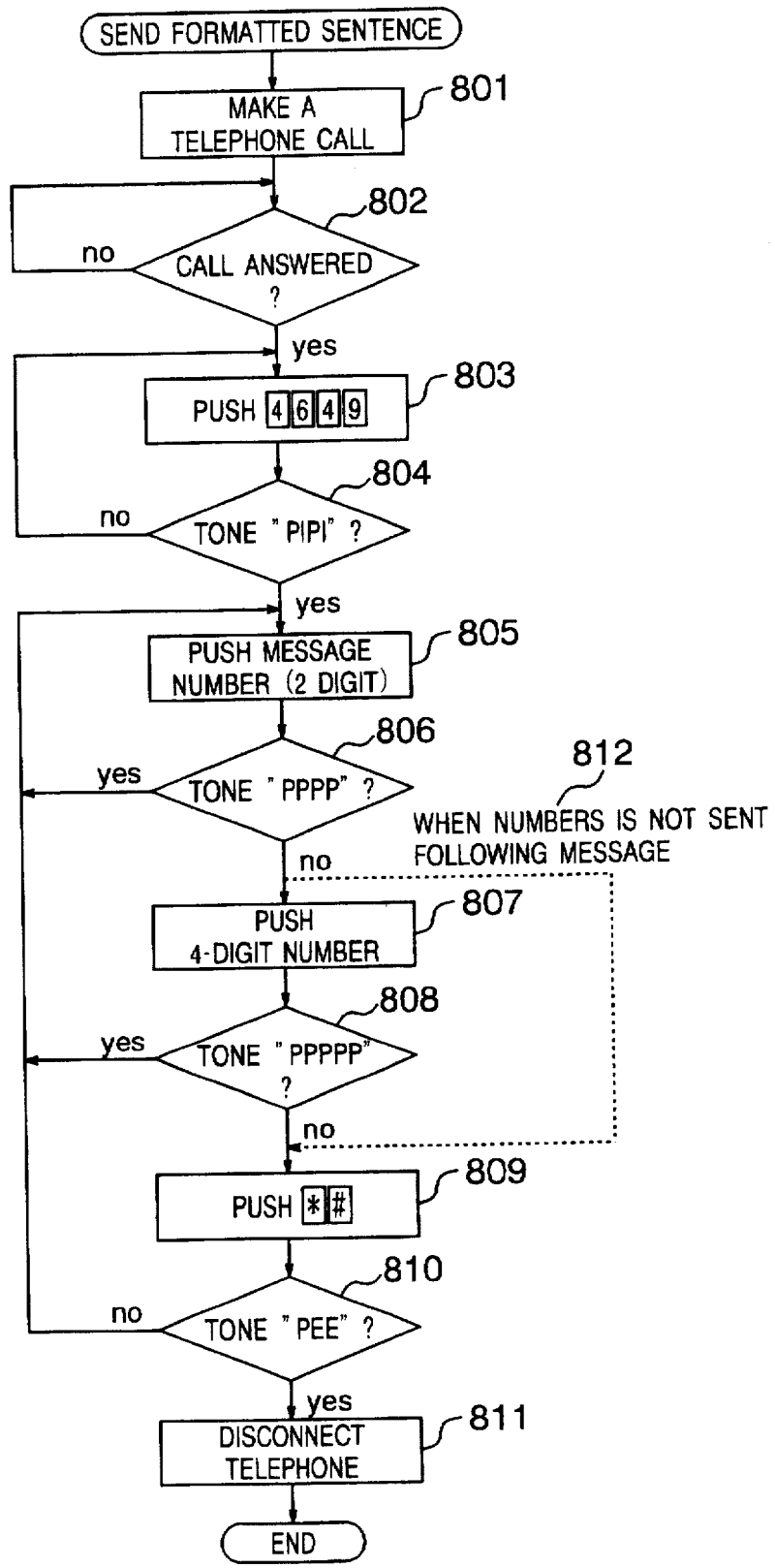
FIG. 25 is a flowchart for explaining how to send a formatted message in the embodiment of FIG. 22.

FIG. 25 shows how to operate when it is desired to use a formatted message, in particular, when the information receiving function of the facsimile apparatus 31' based on the DTMF signal is utilized to send a formatted message. The operation of the facsimile apparatus 31' will be explained later. When it is desired to send a message to the facsimile apparatus 31', a calling user makes a call to the facsimile apparatus of the present embodiment from a DTMF-signal transmittable telephone set and more specifically a telephone set connected to a push-button telephone line or from a telephone set connected to a dial telephone line and having a function of transmitting a tone signal (step 801). When the call is answered (step 802), the calling user pushes push button keys "4649" (step 803). When the calling user makes a call, several telephone connected states may possibly exist. In the first connected state, the facsimile apparatus 31' is automatically connected to the telephone line and issues a response for facsimile reception. In the second connected state, the telephone set 33' connected to the facsimile apparatus 31' is put in its off-hook state. This situation may occur when a called user answers the incoming call using the telephone set 33' or when the telephone set 33' of an automatic answering function automatically answers the incoming call. In any case, when it is desired to send a formatted message, the calling user pushes dialing push-button keys of "4649" to put the facsimile apparatus 31' in the information reception state based on the DTMF signal regardless of what kind of call answering. The facsimile apparatus 31' detects the "4649" indicated by the DTMF signal, and puts itself in the information receivable state based on the DTMF signal. At this time, the sender user can hear a tone "PiPi" received from the called party facsimile apparatus 31' (step 804). This tone is for informing the calling user that the facsimile apparatus 31' is put in the information receivable state based on the DTMF signal. If the pushing of the "4649" results in failure of hearing the tone "PiPi", then the calling user again enters the "4649". After listening to the tone "PiPi", the calling user then pushes a message number corresponding to a desired message to be sent (step 805). As already explained above, the formatted messages for use in the facsimile apparatus of the present embodiment include such 20 sorts of sendable formatted messages as shown in FIG. 27. When the sender user wishes to send a message of "ゴ メ ン ナ サ イ (;;)" (I am sorry (;;)), he/she depresses keys of "01"; whereas, when he/she wishes to send a message of "イ マ カ ラ カ エ リ マ ス" ("0") (I am coming home now), he/she depresses keys of "14". When the calling user depresses the message number in the step 805 and then can listen to a tone "ppp . . . " (step 806), this means that the facsimile apparatus 31' failed to correctly detect the DTMF signal indicative of the message number or the facsimile apparatus 31' failed to correctly detect the message number, as when the calling user depresses a message number not defined yet (such as "30" in the facsimile apparatus of the present embodiment). In such a case, the calling user again pushes the message number. When it is desired to send only a formatted message sentence in the formatted message transmission, the called facsimile apparatus goes to a step 809. However, with respect to the formatted messages for use in the facsimile apparatus of the present embodiment as mentioned above, it is possible to a 4-digit number together with the formatted message sentence. When it is desired to send this 4-digit number, the calling user, after pushing the message number, pushes the 4-digit number (step 807). In the present embodiment, any number of digits of 4 or less may be entered. As in the above message number depression, when the calling user listened to the tone of "ppppp . . . " during the depression of the 4-digit number, this means that the calling user pushed a wrong input key such as entering of "#" or "*". When the calling user listened to the tone of "ppp . . . " during the depression of the 4-digit number, therefore, he/she must again enter the message number, i.e., the sender returns to the step 805. When the sender user failed to listen to the tone of "ppp . . . " indicative of an error, he/she next pushes "*#" (step 809). When the sender user wishes not to push the 4-digit number, that is, when he/she wishes to send the message number alone for the formatted message sentence, he/she pushes "*#" subsequently to the message number (step 809). The "*#" indicates end of the information transmission based on the DTMF signal. The facsimile apparatus 31', when receiving the "*#", sends to the caller a tone of "pee" indicative of normal end of all the operations (step 810). When the calling user failed to listen to the tone of "pee", this means that the facsimile apparatus failed to normally receive the "*#", in which case the calling user hears the tone of "pppp . . . " indicative of an error in place of the normal tone of "pee". In this case, the calling user again enters the information from the message number. When the calling user successfully listened to the tone of "pee", this means that the facsimile apparatus normally terminated the information reception based on the DTMF signal and the reception of the formatted message in this example. So the calling user hooks the handset on (step 811). At this stage, the transmission operations of the formatted message are completed.

Figure 29:
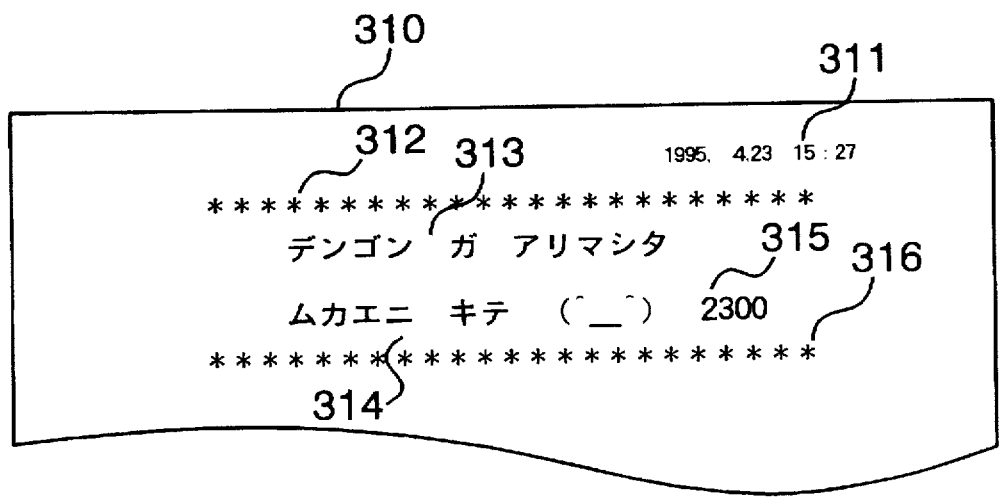
FIG. 29 shows an example of printout result of a formatted message in the embodiment of FIG. 22.

FIG. 29 is an example of printout of the formatted message received through such a procedure as shown in FIG. 25 by the facsimile apparatus 31'. In the present embodiment, a date 311 at which the formatted message was received is printed in the upper right hand corner of a recording paper 310. Subsequently, a line delimiter 312 is printed in the form of a line of "*" and then below the line, a sentence 313 of "フジツ が リソクジ" (There is a message to you) is printed to inform the called user of presence of the message reception. Since the facsimile apparatus of the present embodiment has no such character information as Kanji and Hira-gana characters, all sentences included in the formatted messages are made up of only numbers, alphabets, Kata-kana characters and some symbols. A message sentence 314 ("Come and get me") is printed below the sentence 313, followed by a 4-digit number 315. As already mentioned above, when any number is not entered following the message sentence 314, the 4-digit number will not be printed. Then printed below the message sentence 314 is a line delimiter 316 in the form of a line of "*" like the line delimiter 312. In the present embodiment, the message sentence parts 312 to 316 are printed as magnified 4 times as large as the ordinary characters. In the example of FIG. 29, the size of the message sentence part is made 4 times as large as the size of characters of the date 311. Since the 4-digit number is printed following the message sentence, the number may be used for various purposes, e.g., to inform the called user of a time or a predetermined cipher number.

Figure 26:
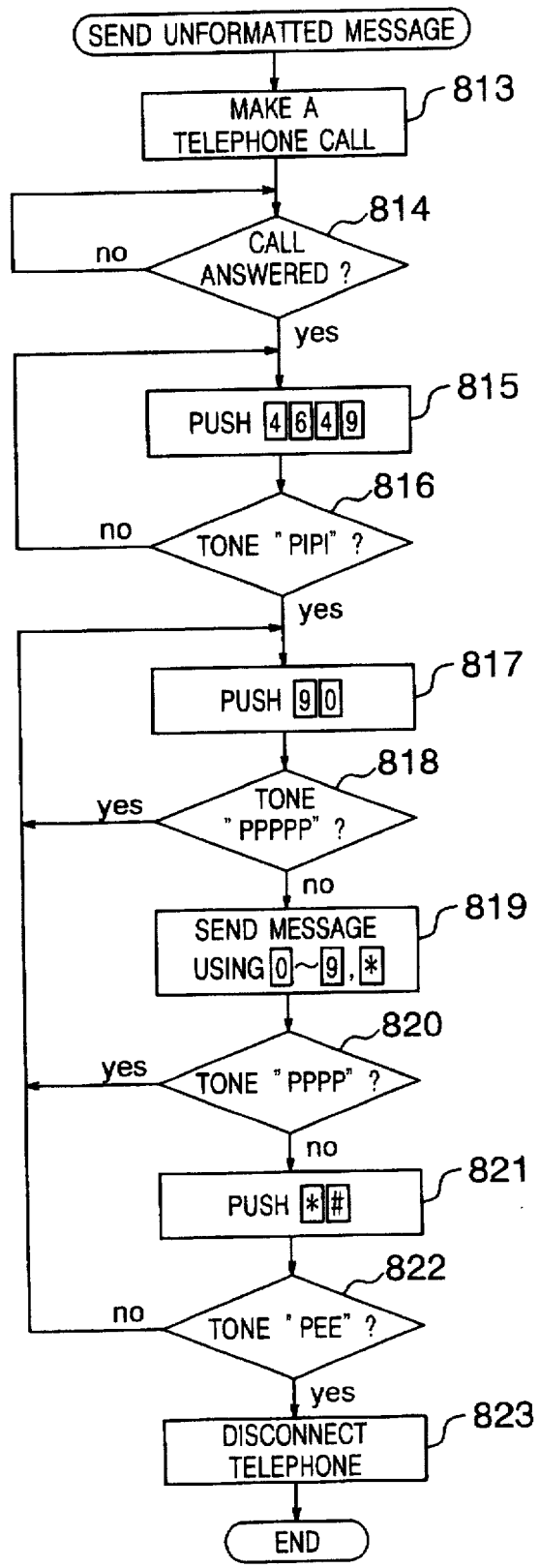
FIG. 26 is a flowchart for explaining how to send an unformatted message in the embodiment of FIG. 22.

Shown in FIG. 26 an operating method when to use an unformatted message is used and in particular when the information receiving function of the facsimile apparatus 31' based on the DTMF signal is utilized to send an unformatted message. The operation of the facsimile apparatus 31' will be described later. When it is desired to send a message to the facsimile apparatus 31', a calling user makes a call to the facsimile apparatus of the present embodiment from a DTMF-signal transmittable telephone set and more specifically a telephone set connected to a push-button telephone line or from a telephone set connected to a dial telephone line and having a function of transmitting a tone signal (step 813). When the call is answered (step 814), the calling user pushes a number "4649" (step 815). Like the transmission of the formatted message, when it is desired to transmit an unformatted message, the calling user pushes "4649" to put the facsimile apparatus 31' in its information reception mode based on the DTMF signal regardless of the way by which the call is answered. When the facsimile apparatus 31' detects of the "4549" based on the DTMF signal and put itself in the information reception mode based on the DTMF signal, the calling user can hear a tone of "pipi" (step 816). This tone is used to inform the caller that the facsimile apparatus 31' can accept the DTMF signal information. If the sender user pushes "4649" but failed to hear the tone "pipi", then he/she again pushes the keys to enter "4649". When hearing the tone "pipi", the calling user next pushes "90" (step 817). In the present embodiment, when the calling user pushes "90" in the step corresponding to the message number of the formatted message, this means to instruct the unformatted message. That is, the operations of the unformatted message are the same as those of the formatted message until the sender user pushes "90". When the calling user pushes a message number in the step 817 and can listen to the tone "ppp . . . " (step 818), this means that the facsimile apparatus 31' failed to correctly detect the "90" indicative of the unformatted message. In such a case, the sender user again pushes "90", after which the calling user sends the unformatted message with use of associated numeral keys (step 819). As mentioned above, only numbers can be basically used in the unformatted message but some symbols can be transmitted by using "*" button and numeral keys in combination. The details will be explained later together with an example of transmission of an unformatted message. When failing to hear an error tone of "pppp" before the completion of pushing operation of the unformatted message (step 820), the calling user pushes symbol keys "*" and "#" to inform the called facsimile apparatus of end of the unformatted message (step 821). When listening to the error tone "pppp", the calling user retries the above operations from the step of pushing "90" (step 817). The symbol "*#" pushed in the step 821 indicates end of the information transmission using the DTMF signal as in the case of the formatted message. The facsimile apparatus 31', when receiving the symbol "*#", sends to the caller a tone "pee" indicative of normal end of all the operations (step 822). When the calling user failed to hear the tone "pee", this means that the facsimile apparatus failed to normally receive the symbol "*#". In such a case, the calling user can usually listen to a tone "pppp . . . " indicative of an error in place of the tone "pee". At this time, the calling user retries the above operations from the step 817 of pushing "90". When succeeding to listen to the tone "pee", this means that the facsimile apparatus normally successfully terminated the reception of the information using the DTMF signal and in this example, the reception of the unformatted message, the calling user hangs up to turn off the telephone (step 823). At this stage, the transmitting operation of the unformatted message is completed.

Though not specifically illustrated, the printing of the unformatted message is also carried out in the same manner as the aforementioned printing of the formatted message. That is, in an example of printout of such a formatted message as shown in FIG. 29, an unformatted message comprising numbers and symbols is printed in the parts corresponding to the formatted message sentence 314 and 4-digit number 315.

Figure 28:
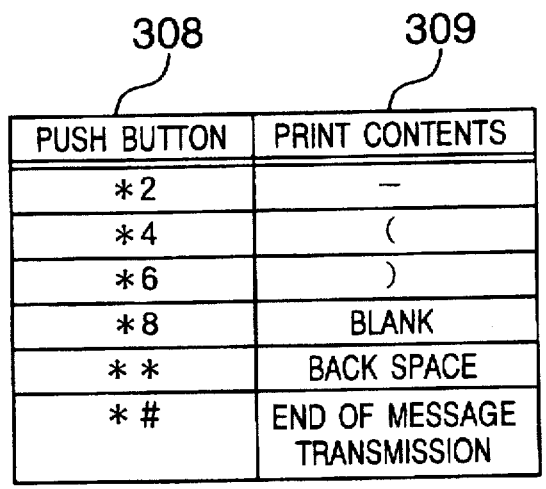
FIG. 28 shows symbols usable upon sending of a unformatted message in the embodiment of FIG. 22.

FIG. 28 shows symbols usable in the unformatted message. Pushing of a push button 308 causes the facsimile apparatus to print a character indicated by a print contents 309. Push button "**", which refers to backspace, is used to cancel one character pushed immediately previously. Push button "*#" indicates end of the unformatted message as mentioned above. For example, when the sender user pushes keys "0", "4", "6", "5", "*", "2", "*", "4", "9", "6", "*", "5", "*", "6", "*", "2", "1", "2", "3", "4", "*", "8", "4", "6", "4" and "9" in this order as an unformatted message, this causes the called-side facsimile apparatus to print "0465-(95)-1234 4649".

Figure 20:
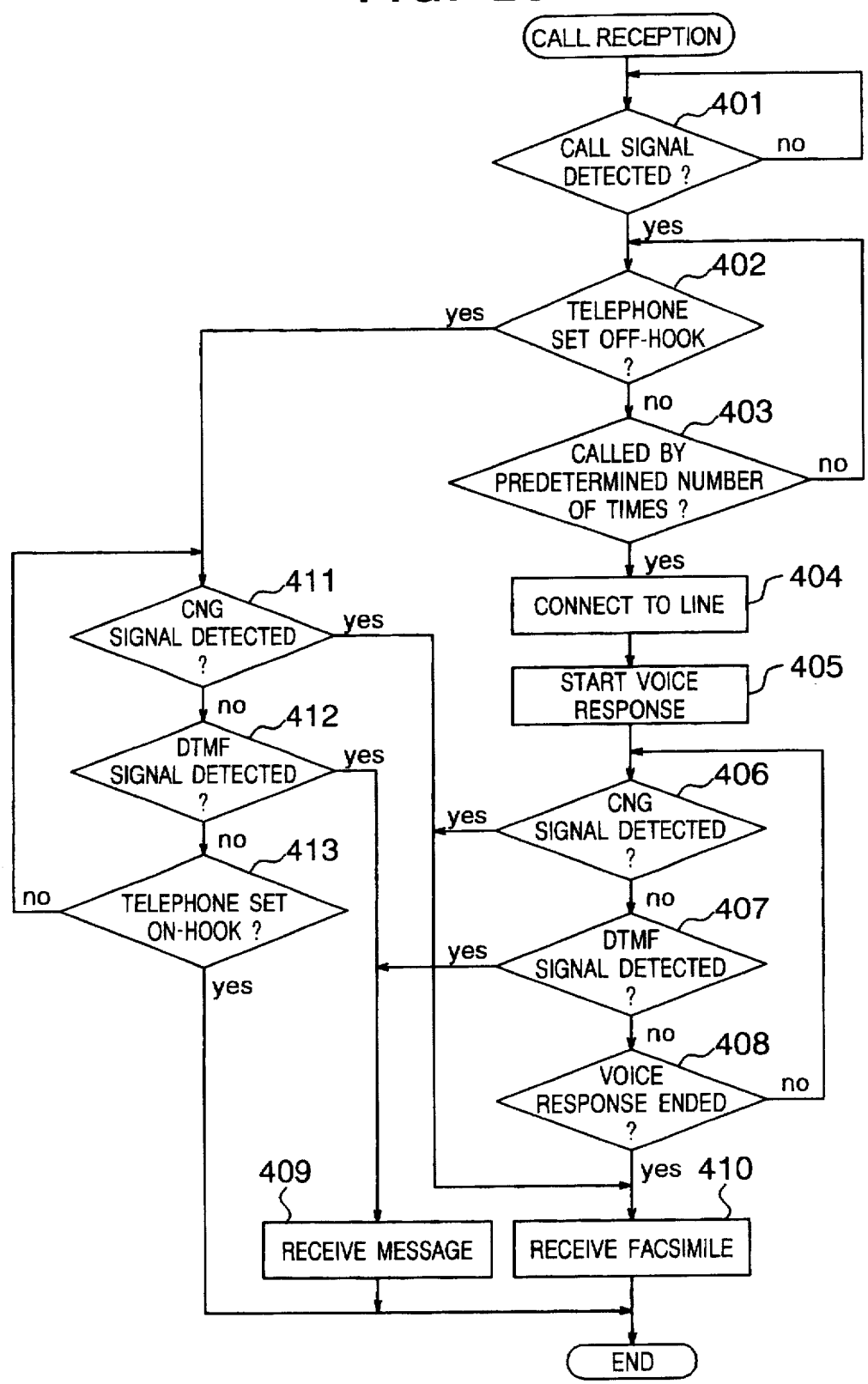
FIG. 20 is a flowchart for explaining a flow of operation at the time of receiving a signal in the facsimile apparatus of the embodiment of the present invention.
Figure 21:
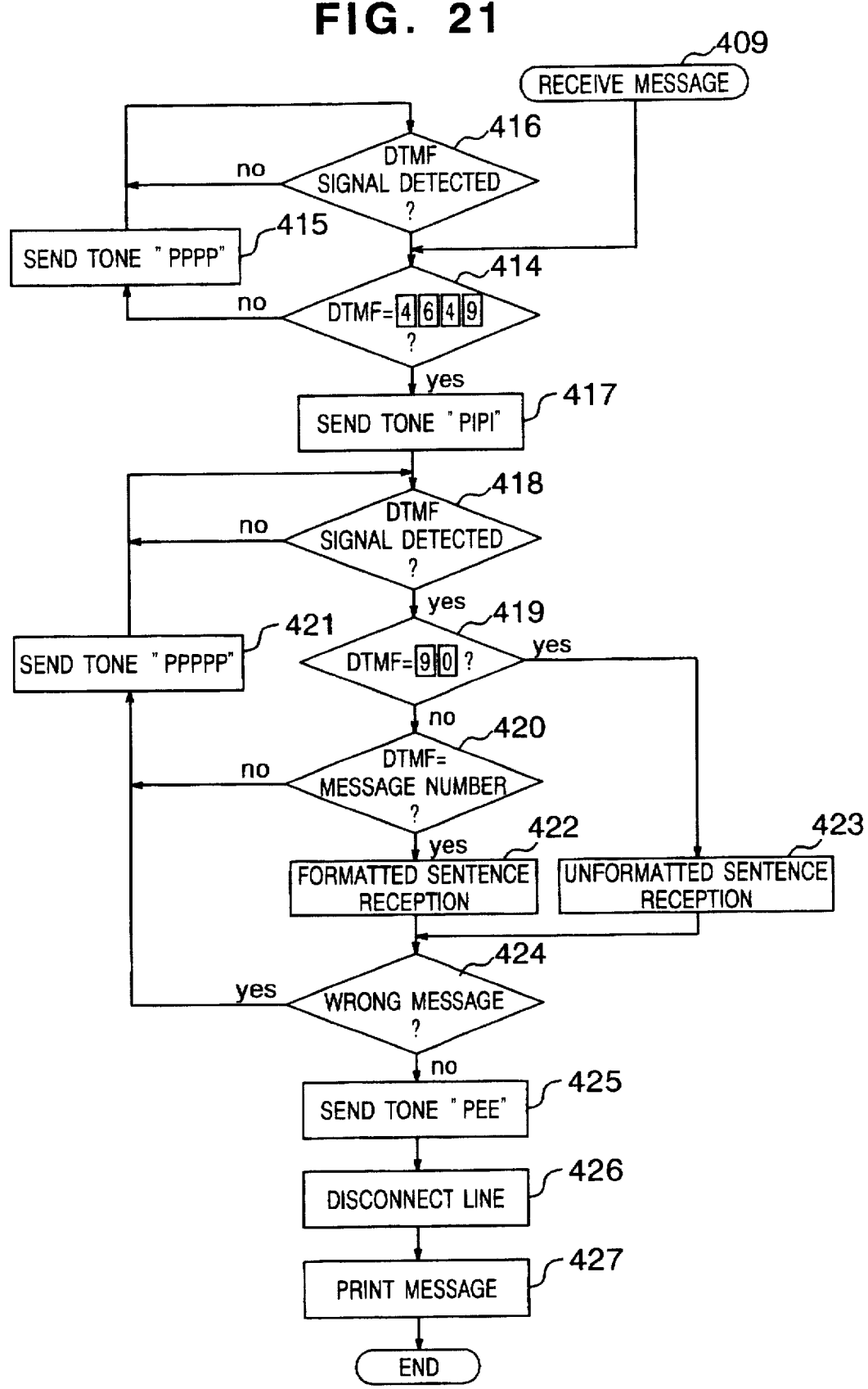
FIG. 21 is a flowchart for explaining a flow of a message receiving operation in FIG. 20.

Shown in FIG. 20 is a flow of operations when the facsimile apparatus 31' performs information reception based on the DTMF signal according to the flowchart of FIG. 21.

As shown in the step 401 of FIG. 20, the control unit 37 of the facsimile apparatus 31' controls the CML relay 54 of the NCU 42 to set the CML relay 54 to its contact side b, whereby the call signal detector 52 detects the presence or absence of an incoming call signal from the telephone line 32. When the call signal detector 52 detects the incoming call signal from the telephone line 32, i.e., when a telephone call is received, the control unit 37 detects the presence or absence of the off-hook state of the telephone set 33' connected to the facsimile apparatus 31' (step 402) while waiting for reception of the incoming call signal by a predetermined number of times (step 402). The detection of absence or absence of the off-hook state of the telephone set 33' is carried out by the telephone unit hook detector 53 of the NCU 42. At this time, since the CML relay 54 is still set to the contact side b, the call signal sent from the telephone line 32 is sent to the call signal detector 52 of the NCU 42 of the facsimile apparatus 31' and also to the telephone set 33' via the telephone unit hook detector 53. As a result, the ringing tone received from the telephone line causes the telephone set 33' to ring to inform the user of the facsimile apparatus 31' of the presence of the incoming call. Even after the telephone set 33' rings by a predetermined number of times, when the telephone unit hook detector 53 failed to detect the off-hook state of the telephone set 33', the control unit 37 controls the CML relay 54 to switch the CML relay 54 to its contact side a to connect the switch to the line (step 404). The present embodiment is assumed that the number of ringings before the facsimile apparatus 31' is connected to the telephone line, i.e., the aforementioned predetermined ringing frequency is about 6–8. When the connected telephone set 33' is of an ordinary type, some 6 or 8 ringings are considered to be enough for the called user to answer the call. That is, the called user can answer the phone before the facsimile apparatus 31' is connected to the line. In the case where the telephone set 33' is of an automatic answering type, in its normal operation, the telephone set can automatically answer the call for its automatic answering after some 2–5 ringings, which will be no problem. In other words, before the facsimile apparatus is connected to the line, the automatic answering telephone set is automatically connected to the line to perform the automatic answering operation. When the automatic answering telephone set executed its automatic answering function, the telephone set 33' is put in its off-hook state at this time, so that the off-hook state is detected in the step 402.

After the control unit 37 of the facsimile apparatus 31' is controlled to connect the facsimile apparatus 31' to the line, the speech synthesizer unit 55 of the NCU 42 starts transmission of a voice response to the telephone line 32 (step 405). The voice response in this case has such contents that "I am out now. For telephone, please call again later. For facsimile communication, please continue your transmission." In addition, such contents as to inform the caller that the information reception based on the DTMF signal is possible may be added to the voice response. In addition to starting the transmission of such a voice response, the control unit 37 is continuously controlled so that a CNG signal detector 56 detects the presence or absence of a CNG signal received from the telephone line 32 (step 406) or a DTMF signal detector 39' detects the presence or absence of the DTMF signal received from the telephone line 32 (step 407), until the above voice response is completed (step 408).

When the CNG signal is not detected in the step 406 and the transmission of the voice response is completed before the DTMF signal is also not detected in the step 407, the control unit 37 of the facsimile apparatus 31' carries out its facsimile receiving operation (step 410). That is, the facsimile communication section 34 carries out its facsimile communication to print the received image in the recorder 36. Even when the CNG signal was detected in the step 406, the control unit 37 carries out its facsimile receiving operation (step 410). As mentioned above, the CNG signal is used to inform the called side that the facsimile transmission facsimile apparatus is going to transmit the facsimile to the called side. When detecting such a CNG signal as shown in FIG. 20, the called-side facsimile apparatus shifts its current operation to the facsimile receiving operation.

When the DTMF signal was detected in the step 407, the message receiving operation is carried out (step 409). The message receiving operation will be detailed later.

Explanation will be made as to a flow of operations when the telephone unit hook detector 53 of the NCU 42 detects in the step 402 that the telephone set 33' connected to the facsimile apparatus 31' was put in its off-hook state in response to the call signal from the telephone line 32. When detecting the off-hook state of the telephone set 33', the control unit 37 of the facsimile apparatus 31' starts the detection of the CNG signal by the CNG signal detector 56 (step 411) and the detection of the DTMF signal by the DTMF signal detector 39 (step 412). In the present embodiment, these detections are continued until the telephone unit hook detector 53 detects in the step 413 that the telephone set 33' connected to the facsimile apparatus 31' was put in the off-hook state. Change to the on-hook state of the telephone set 33' indicates, in the case where the telephone set 33' is of an ordinary type, and the user of the telephone set 33' has answered a telephone call, causing the telephone set to put in the off-hook state, that the telephone speech is now completed and the user hangs up. In the case where the telephone set 33' is an automatic answering telephone set and has automatically been connected to the line for its automatic answering operation, causing the telephone set 33' to already put in the off-hook state, the change to the on-hook state of the telephone set 33' indicates that the automatic answering, i.e., the message recording is now completed to thereby disconnect the automatic answering telephone set from the line. The period of the detection of the CNG signal and the period of the detection of the DTMF signal are set depending on the use circumstances of the facsimile apparatus, e.g., so as to be a predetermined time after the detection of the off-hook state. In the present embodiment, the period of the CNG signal detection and the period of the DTMF signal detection are both set to be a time from the detection of the off-hook state to the detection of the on-hook state.

When detecting the CNG signal in the step 411, the control unit 37 controls the CML relay 54 to set the CML relay 54 at its contact side a and to perform the facsimile receiving operation (step 410). Even when detecting the DTMF signal in the step 412, the control unit 37 controls the CML relay 54 to set the CML relay 54 at its contact side a and to perform the message receiving operation (step 409).

When the telephone unit hook detector 53 failed in the step 413 to detect that the telephone set 33' was put in the on-hook state, the operation is terminated without any change.

Explanation will next be made as to a flow of message receiving operation shown in the step 409 of FIG. 20 in connection with FIG. 21. In the message reception, it is first checked whether or not the DTMF signal detected in the step 407 or 412 of FIG. 20 is "4649" (step 414). As already explained above in FIGS. 25 and 26, in the information reception utilizing the DTMF signal of the facsimile apparatus of the present embodiment, pushing operation of "4649" using the DTMF signal is carried out to put the facsimile apparatus in the information receivable state based on the DTMF signal. When the "4649" was detected in the step 414, the control unit 37 sends a tone "pipi" to the telephone line 32 to inform the caller that the called facsimile apparatus was put in the information receivable state based on the DTMF signal (step 417). In the facsimile apparatus of the present embodiment, the transmission of the tone "pipi" is carried out from the speech synthesizer unit 55 of the NCU 42. When the DTMF signal detected in the step 414 is not the "4649", the control unit 37 sends the tone "ppp . . ." to the telephone line 32 to inform the caller of an error. The transmission of the tone "ppp . . ." is also carried out by the speech synthesizer unit 55 like the transmission of the tone "pipi". When it is detected in the step 414 that the DTMF signal is not the "4649", the control unit 37 sends in the step 415 to the telephone line 32 the tone "ppp . . . " indicative of an error and then detects the presence or absence of reception of the DTMF signal from the telephone line 32 (step 416). As has been explained above in connection with the explanation about the operating method in FIGS. 25 and 26, when pushing of the "4649" caused the tone "pppp . . . " to be returned as a response, the calling user again pushes the "4649". This detection is carried out in the step 416. Possible reasons why the DTMF signal is detected not to be the "4649" in the step 414 include pushing of wrong keys by the user, a bad line condition resulting in failure of correct detection of the DTMF signal pushed by the calling user or detection of DTMF signal not pushed by the user due to the conversation of the telephone set 33'.

After transmitting the tone "pipi" in the step 417, the control unit 37 detects the DTMF signal (step 418). When the leading 2 digits of the DTMF signal detected in the step 418 is "90" (step 419), the reception of an unformatted message is carried out (step 423). When the leading 2 digits of the DTMF signal detected in the step 418 is one of the message numbers of the formatted messages shown in FIG. 27 (step 420), the reception of a formatted message is carried out (step 422). When the DTMF signal detected in the step 418 is neither the "90" nor the message number of the formatted message, the control unit 37 sends to the telephone line 32 the tone "pppppp" to inform the caller of an error (step 421), and returns to the detection of the DTMF signal in the step 418 to wait for the calling user to again send the DTMF signal. As in the transmission of the tone "pppp" in the step 415, the transmission of the tone "pppp" in the step 421 is also carried out by the speech synthesizer unit 55. The DTMF signal detected in the step 418 and checked in the steps 419 and 420 is stored once in the DTMF signal storage 75.

In the reception of the formatted message in the step 422, the third and subsequent digits of the DTMF signal stored in the DTMF signal storage 75 are checked. It is already confirmed in the step 420 that the leading 2 digits of the DTMF signal is one of the message numbers of the messages shown in FIG. 27. When the third and subsequent digits of the DTMF signal is determined to be a number, this is when number information of 4 or less digits explained in FIG. 25 is entered. As mentioned above, in the present embodiment, the number information is limited to one to 4 digit numbers and symbols such as "*" and "#" cannot be used. Accordingly, in the case of the formatted message, the DTMF signal stored in the DTMF signal storage 75 is structured to have a format of "message number"+"*#" or "message number"+"number of 4 or less digits"+"*#". When "*" or "#" is included in the number of 4 or less digits, this message is wrong. When detecting the wrong message (step 424), the control unit 37 sends the error tone "pppp" and returns again to the step 418 to again detect the DTMF signal. Accordingly, when the calling user wrongly conducts the operating method in the formatted message and listens to the returned tone "pppp", the calling user again enters the procedure from the message number. In the present embodiment, when a number of 5 or more digits is detected between the message number and "*#", the last 4 digits are treated as valid. When it is desired to specify, e.g., the message number 15 and the calling user enters "15123456*#", the message corresponding to the message number 15 as well as "3456" as a 4-digit number are printed.

When detecting no wrong message in the step 424, the control unit 37 sends the tone "pee" to the telephone line 32 (step 425). The tone "pee" is used to inform the calling user of normal reception of the formatted message. In the present embodiment, the sending of the tone "pee" is also carried out by the speech synthesizer unit 55 of the NCU 42. After sending the tone "pee", the control unit 37 controls the CML relay 54 of the NCU 42 to connect the CML relay 54 at its contact side b to disconnect the telephone line (step 426). Subsequently, the control unit 37 prints the formatted message in accordance with the DTMF signal stored in the DTMF signal storage 75 (step 427). The format of printing the formatted message is as explained in FIG. 29. Explanation will be made as to a flow of printing operation.

Figure 30:
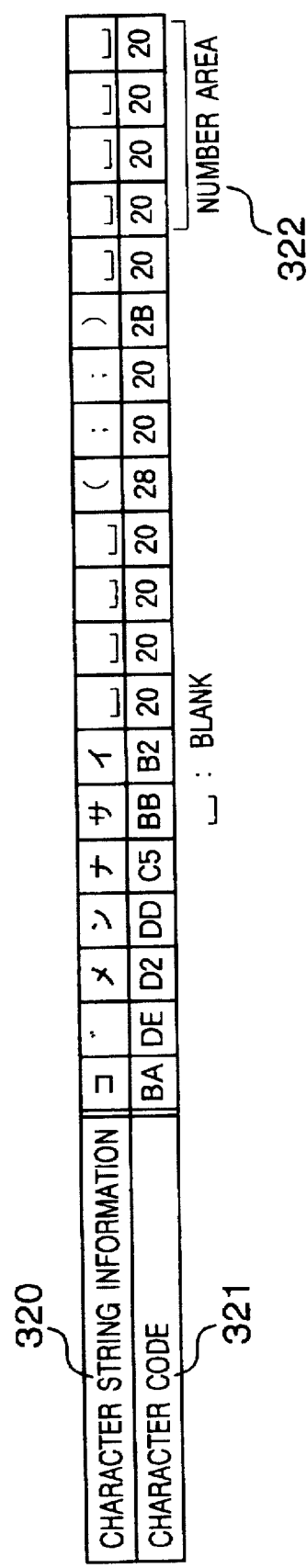
FIG. 30 shows an example of how to store character string information in the embodiment of FIG. 22.

Explanation will first be made as to how to store sentence information of formatted messages in the facsimile apparatus 31'. In the present embodiment, respective characters forming a character string are expressed in terms of such character codes as shown in FIG. 8 in connection with the embodiment of FIG. 3 and then are stored in the character string information storage 40. Each character is expressed in terms of one-byte data. In the table of FIG. 8, the hatched areas 210 are not used in the present embodiment. In the table, for example, a character "2" is expressed by a code "32 (in hexadecimal notation)" and a character "M" is by a code "4D (in hexadecimal notation)". FIG. 30 shows how the character string information of the message sentence of the formatted message of the message number "01" in FIG. 27 are stored in the character string information storage 40. Each of the characters of the message sentence is defined by such character codes 321 as shown in FIG. 8. In this example, the character codes 321 are each expressed in terms of a hexadecimal number. The message sentence characters are stored in the character string information storage 40 in such a manner that first character "ﾞ" in the code table of FIG. 8 is stored at the character code "BA" and the second symbol representing a voiced consonant mark is at the character code "DE". In the character string information storage 40, the contents of the character string information corresponding to the respective message numbers in FIG. 27 are stored in the form of an array of character codes of 20 characters per message. In the formatted message of the present embodiment, number information of 4 or less digits can be attached as explained in FIG. 25. A number area 322 for printing of such number in the character string information storage 40 is filled with character codes each indicative of 'blank'. As a result, when number information of 4 or less digits is not entered in a formatted message, the 'blank' is printed in place of the number information.

How to express each character is the same as that shown in FIG. 10 and used in connection with the embodiment of FIG. 3, and thus detailed explanation thereof is omitted. In the present embodiment as well, one character is represented by a total of 35 dots (5 dots (horizontal)×7 dots (vertical)). The information of all the characters shown in FIG. 8 are stored in the character information storage 41 of FIG. 24 in such a format as mentioned above. Reference to the character information by the control unit 37 is carried out based on the associated character code and line number (n-th line). For example, when the data of the fourth line in the character code "B2" (character " ィ") is demanded to the character information storage 41, the character information storage 41 outputs "0C" (in hexadecimal notation).

When it is desired to print a sentence corresponding to a message, the control unit 37 reads out the associated message number based on the DTMF signal being stored in the DTMF signal storage 75 and refers to the aforementioned character string information storage 40 to thereby obtain character string information of the message. The control unit 37 then obtains from the character information storage 41 character patterns of characters in the character string information. These character patterns are rearranged in such a format as shown in FIG. 29 and then printed by the recorder 36.

Explanation will next be made as to the unformatted message receiving operation (step 423) in FIG. 21. In the step 423, the third and subsequent digits of the DTMF signal stored in the DTMF signal storage 75 are checked. It is already confirmed in the step 419 that the leading 2 digits of the DTMF signal stored in the DTMF signal storage 75 are "90" indicative of an unformatted message. The unformatted message in the present embodiment is structured to have numbers and such contents as shown in FIG. 28, as explained above. When the DTMF signal having symbols other than the above is detected, this results in the wrong message error. Such an error takes place, e.g., when "#" is detected other than the "*#" indicative of ene of a message or when a number other than "2", "4", "6", "8", "*" and "#" is detected subsequently to *. In the present embodiment, the unformatted message is assumed to have a maximum length of 20 characters. Accordingly, when the DTMF signal having a length exceeding 20 characters is entered, this becomes a wrong message or message error. When detecting the message error in the step 424, the control unit 37 sends the error tone "ppppp" as in the formatted message, and in response to it, the control unit 37 retries the procedure from the detection of the DTMF signal corresponding to the message number. Accordingly, the calling user again enters the message number when listening to the error note "pppp". When failing to detect the message error in the step 424 as in the formatted message, the control unit 37 sends the tone "pee" to inform the calling user of normal reception of the unformatted message (step 125), controls the CML relay 54 of the NCU 42 to set the CML relay 54 to its contact side b and to disconnect the line therefrom (step 426), and then orders to print the unformatted message in accordance with the DTMF signal stored in the DTMF signal storage 75 (step 427).

In the printing of the unformatted message, the control unit 37 reads out from the character information storage 41 the number/character information corresponding to the DTMF signal stored in the DTMF signal storage 75, and rearranges it in such a format as shown in FIG. 29 to print it in the recorder 36.

FIG. 29 shows an example of printout of the formatted message, in which, in the case of the unformatted message, numbers entered as the unformatted message are printed at positions shown by numerals 314 and 315 as mentioned above. When the DTMF signal read out from the DTMF signal storage 75 indicates such a symbol "*2", "*4", "*6" or "*8" as shown in FIG. 29, the control unit 37 changes it to "–", "(", ")" or "blank" respectively. In the case of "**", one character immediately after that is processed as regarded as absent.

As has been explained in the foregoing, the facsimile apparatus of the present embodiment detects the hook state of a telephone set connected to the facsimile apparatus, detects the DTMF signal received from the telephone line when detecting an off-hook state in response to a telephone call, and performs the DTMF signal information reception when detecting the DTMF signal. As a result, even in the case where the facsimile apparatus is not connected to the line such as when the receiver user answer the incoming call by picking up the handset of the telephone set connected to the facsimile apparatus or when the connected telephone set is of an automatic answering type and automatically answers the incoming call, the facsimile apparatus of the present embodiment can receive the DTMF signal information.

In accordance with the facsimile apparatus of the present invention, since the facsimile apparatus detects the off-hook state of the telephone set connected thereto and starts the detection of the DTMF signal, even when the receiver user answers the incoming call by picking up the handset of the telephone set connected to the facsimile apparatus or when the telephone set connected to the facsimile apparatus has an automatic answering function and the telephone set automatically answers the incoming call, the facsimile apparatus of the present embodiment can advantageously receive the DTMF signal information.

Although the foregoing explanation has been made in connection with the case where the facsimile apparatus of the present invention is applied to Japanese, it will be readily appreciated to those skilled in the art that the invention can be applied to any languages.

What is claimed is:

1. A facsimile apparatus comprising:

dialing-signal detection means for detecting a dialing signal transmitted from a telephone line;

recorder means for printing image information;

image information memory means for storing therein a plurality of image information and unique numbers associated with said plurality of image information; and control means for, when the dialing signal detected by said dialing-signal detection means indicates one of said unique numbers, performing control to cause acquisition of one of the image information stored by said image information memory means corresponding to said one unique number, and to cause said recorder means to print the acquired image information.

2. A facsimile apparatus as set forth in claim 1, further comprising:

image read-out means for reading out the image information from an original document; and image registration means for storing in said image information memory means the image information read out by said image read-out means attached with the corresponding unique number.

* * * * *